US008857969B2

(12) United States Patent
Imamura et al.

(10) Patent No.: US 8,857,969 B2
(45) Date of Patent: *Oct. 14, 2014

(54) INK COMPOSITION, INK SET, AND IMAGE FORMING METHOD

(75) Inventors: Mika Imamura, Kanagawa (JP); Misato Sasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 13/586,168

(22) Filed: Aug. 15, 2012

(65) Prior Publication Data
US 2013/0050364 A1 Feb. 28, 2013

(30) Foreign Application Priority Data

Aug. 31, 2011 (JP) ................. P2011-189990

(51) Int. Cl.
*B41J 2/01* (2006.01)

(52) U.S. Cl.
USPC ............................ 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............. 347/100, 95, 96, 101, 102, 21, 20, 9; 106/31.6, 31.13, 31.27; 523/160, 161
See application file for complete search history.

(56) References Cited

U.S. PATENT DOCUMENTS

| 2009/0239981 | A1 | 9/2009 | Morimoto |
| 2010/0075052 | A1 | 3/2010 | Irita |
| 2010/0080913 | A1* | 4/2010 | Irita .......................... 427/258 |
| 2011/0205289 | A1* | 8/2011 | Irita et al. .................. 347/21 |
| 2011/0211013 | A1* | 9/2011 | Matsumoto et al. ........... 347/21 |

FOREIGN PATENT DOCUMENTS

| JP | 2006-176623 A | | 7/2006 | |
| JP | 2008-156524 A | | 7/2008 | |
| JP | 2009-102454 A | | 5/2009 | |
| JP | 2009-227719 A | | 10/2009 | |
| JP | 2010-70693 A | | 4/2010 | |
| JP | 2011-105826 A | | 6/2011 | |
| JP | 2011105826 A | * | 6/2011 | ................ B41J 2/01 |

OTHER PUBLICATIONS

Japanese Office Action dated Aug. 27, 2013 for Japanese Application No. 2011-189990 with English translation.

* cited by examiner

*Primary Examiner* — Manish S Shah
(74) *Attorney, Agent, or Firm* — Birch, Stewart, Kolasch & Birch, LLP

(57) ABSTRACT

Disclosed is an ink composition with excellent adhesiveness of an image on a recording medium and recoverability after being left for a period. The ink composition of the present invention contains coloring particles that include a quinacridone solid solution pigment including two or more types of quinacridone-based compounds, a synergist including a basic group, and a high-molecular weight vinyl polymer, a water-soluble polymerizable compound, a polymerization initiator and water.

17 Claims, No Drawings

INK COMPOSITION, INK SET, AND IMAGE FORMING METHOD

BACKGROUND OF THE INVENTION

1. Field of the Invention

The present invention relates to an ink composition, an ink set, and an image forming method.

2. Description of the Related Art

In recent years, various materials have been used as ink jet recording media, and in addition to ink jet-specific paper, printing media such as, for example, commercially available plain paper, fine paper, coated paper, and art paper have been used. High image quality is sought when recording on any of the materials.

Even in a case where plain paper or a printing medium is used or the like, pigments are preferable as the ink coloring material that can form an image with high robustness in terms of water resistance, light resistance, and the like. Among inks that include pigments, water-based pigment inks are gathering attention from the viewpoints of cost effectiveness, safety in terms of global environment, work environment, and the like. Among such inks, a quinacridone-based pigment is preferably used as a magenta pigment for ink jets.

As a water-based ink for ink jet recording, water dispersions of water-insoluble vinyl polymer particles that contain a quinacridone-based pigment such as one or both of C.I. Pigment Red 122 and C.I. Pigment Violet 19 and a pigment derivative with a quinacridone skeleton in which an acidic group is introduced to an organic pigment have been disclosed (for example, refer to JP2006-176623A). However, with such a configuration, since the ink cannot be maintained stably when the ink is used after being kept for an extended period or at high temperature, there are problems in which density unevenness and streak unevenness occur.

In view of the problem described above, a water-based ink for ink jet recording that contains coloring particles in which a quinacridone-based pigment, a synergist including a basic group, and a predetermined high-molecular weight vinyl polymer are included in an aqueous liquid medium has been proposed (for example, refer to JP2009-227719A). The water-based ink has excellent discharge stability.

Further, a water-based active energy beam curable ink that contains a water-soluble photopolymerization material that radically polymerizes, a specific water-soluble photopolymerization initiator, and an anionic water-based pigment dispersing element have been disclosed (for example, refer to JP2009-102454A). Further, a water-based ink composition including a water-soluble polymerizable compound, a photopolymerization initiator, and a water-insoluble coloring material has been disclosed (for example, refer to JP2011-105826A), and a quinacridone solid solution pigment is exemplified as the water-insoluble coloring material.

SUMMARY OF THE INVENTION

However, among the techniques of the related art described above, with the ink composition that uses a synergist and a high-molecular weight vinyl polymer along with a quinacridone-based pigment, there is a problem in which in a case where the ink composition is configured to be ultraviolet curable or the like while containing a certain concentration level of the pigment, ultraviolet rays and the like do not reach the deep portions of the ink drops that land, resulting in an inferior adhesion ability with respect to the recording medium of an image.

On the other hand, solid solution pigments in which a quinacridone-based pigment or the like is solid-dispersed are generally known to have poor dispersion stability in water-based solutions, and especially in curable compositions in which there are monomer components with relatively hydrophobic characteristics or initiator components, the decrease in the dispersion stability tends to be considerable. Therefore with ink compositions in which a solid solution pigment is the coloring material, it is difficult to maintain the expected ink characteristics in a case where the ink composition is kept for a prolonged period or in a high temperature environment. If the dispersibility of the pigment within the ink cannot be maintained stably, when discharge is momentarily stopped and discharge is restarted after a period of time, stable discharge characteristics that are comparable to before the stoppage of discharge may not be obtained.

The present invention is made in order to solve the problem described above, and an object thereof is to provide an ink composition with excellent adhesiveness of an image on a recording medium and recoverability after being left for a period, an ink set, and an image forming method.

It has been discovered that in a case where an ink composition that is cured by radiation such as ultraviolet rays is configured, a solid solution pigment is effective in order to cause ultraviolet rays and the like to reach the deep portions of ink that lands and to increase the adhesiveness of an image as a result, and based on the discovery, the present invention is achieved based on the dispersion behavior of the solid solution pigment.

Specific means for achieving the subject described above is as below.

<1> An ink composition including: coloring particles that include a quinacridone solid solution pigment including two or more types of quinacridone-based compounds, a synergist including a basic group, and a high-molecular weight vinyl polymer; a water-soluble polymerizable compound; a polymerization initiator; and water.

<2> The ink composition according to <1>, wherein the ratio [q:p (mass ratio)] between the quinacridone solid solution pigment (q) and the polymerizable compound (p) is 1:1 to 1:20.

<3> The ink composition according to <1> or <2>, wherein the synergist includes a structural moiety derived from at least one type selected from the group consisting of a quinacridone derivative, a triazine derivative, an acridone derivative, and an anthraquinone derivative.

<4> The ink composition according to any one of <1> to <3>, wherein the quinacridone solid solution pigment is at least one of a solid solution pigment of an unsubstituted quinacridone and a dimethyl-substituted quinacridone, and a solid solution pigment of an unsubstituted quinacridone and a dichloro-substituted quinacridone.

<5> The ink composition according to any one of <1> to <4>, wherein the polymerizable compound is represented by the following General Formula (1). In the following General Formula (1), Q represents an n-valent group and $R^1$ represents a hydrogen atom or a methyl group. n represents an integer equal to or greater than 1.

[Chem. 1]

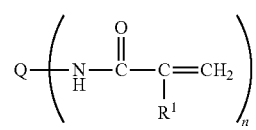

General Formula (1)

<6> An ink set including the ink composition according to any one of <1> to <5>; and a treatment liquid including an agglomeration component that agglomerates the ink composition when coming into contact with the ink composition.

<7> The ink set according to <6>, wherein the agglomeration component is an acidic compound.

<8> An image forming method including applying an ink of forming an image by applying the ink composition according to any one of <1> to <5> to a recording medium through an ink jet method.

<9> The image forming method according to <8>, further including: applying a treatment liquid including an agglomeration component that agglomerates the ink composition when coming into contact with the ink composition to the recording medium.

According to the present invention, an ink composition with excellent adhesiveness of an image on a recording medium and recoverability after being left for a period, an ink set, and an image forming method are provided.

DESCRIPTION OF THE PREFERRED EMBODIMENTS

Details of the ink composition, the ink set, and the image forming method using the ink composition and the ink set of the present invention will be described below.

<Ink Composition>

The ink composition of the present invention is configured to be curable using coloring particles, a water-soluble compound, a polymerization initiator, and water, and the coloring particles of the present invention are configured using a quinacridone solid solution pigment including two or more types of quinacridone-based compounds, a synergist including a basic group, and a high-molecular weight vinyl polymer.

The ink composition of the present invention may be configured to further include a water-soluble organic solvent, a surfactant, other additives, and the like as necessary.

For example, Pigment Red 122 or the like that is a magenta pigment is generally known to have a narrow color reproduction region when used alone, and a method of using a plurality of pigments together or the like is adopted. Out of the plurality of pigments, a solid solution pigment formed by two or more types of pigments is considered useful from the viewpoint of securing a wide color reproduction region. However, solid solution pigments tend to fall off even when the surface thereof is covered by a dispersed polymer, and therefore cannot be easily stably dispersed in an aqueous medium. In particular, if a solid solution pigment is configured to be curable by including a monomer component and an initiator component, the dispersibility of the solid solution pigment tends to deteriorate further due to the hydrophobic properties of the components. On the other hand, compared to a case where a plurality of types of non-solid-solution single pigments are used, a solid solution pigment has the advantage of being able to have a smaller particle diameter, reducing the pigment concentration. That is, a solid solution pigment is advantageous in terms of the curing principle for curable ink that is cured using ultraviolet rays or the like.

Due to such circumstances, in the present invention, by dispersing and containing a solid solution pigment as the pigment component in a case where a curable ink composition is obtained by including a polymerizable compound and a polymerization initiator, the pigment particle diameter is kept small and the pigment concentration is reduced. As a result, since the ultraviolet rays or the like infiltrate to the deep portions of the ink and a favorable curing property is obtained, the adhesiveness of the image can be increased.

While a solid solution pigment generally has inferior dispersibility and stability in an aqueous medium, in order to obtain a curable ink with favorable curability while also expanding the color reproduction region, a configuration using a solid solution pigment is important. While a high-molecular weight vinyl polymer is contained as a pigment dispersant, by also including a synergist including a basic group, it is possible to effectively maintain the dispersibility and the stability of the solid solution pigment from which the polymer that modifies the surface in particular tends to fall off even with a curable composition using a monomer component and an initiator component. Therefore, by using a synergist including a basic group and a high-molecular weight vinyl polymer together along with the solid solution pigment, the improvement effect in the stability of the ink composition after time is remarkable, and the ink discharge ability after time (recoverability after being left for a period) improves further.

The constituent components of the ink composition of the present invention will be described in detail below.

—Coloring Particles—

The ink composition of the present invention includes at least one type of coloring particles that include a quinacridone solid solution pigment including two or more types of quinacridone-based compounds, a synergist including a basic group, and a high-molecular weight vinyl polymer. While a quinacridone solid solution pigment generally has poorer dispersibility in a water-based medium compared to a single pigment, a quinacridone solid solution pigment has an excellent improvement effect in the dispersibility and stability thereof due to the synergist and the high-molecular weight vinyl polymer.

(Quinacridone Solid Solution Pigment)

The coloring particles of the present invention contain at least one type of the quinacridone solid solution pigment including two or more types of quinacridone-based compounds as a coloring particle component. A magenta pigment generally has a narrow color reproduction region and the color reproduction region of a quinacridone pigment is not necessarily sufficient either. Therefore, from the viewpoint of expanding the color reproduction region even if the dispersibility deteriorates, a quinacridone solid solution pigment is contained.

The quinacridone solid solution pigment of the present invention is obtained by turning two or more types of quinacridone-based compounds into a solid solution, and is a pigment with excellent color tone and favorable color reproduction region, and also with various physical properties such as weather resistance and solvent resistance.

As a solid solution pigment, a solid mixture in which a compound with two or more types of different pigments or a similar pigment skeleton in which one enters the structure of the other in a physically and chemically stable state and which has a single phase in an equilibrium state, or a crystalline body in which another crystalline body is dissolved can be considered. Specifically, for example, a pigment that exists as mixed crystals of a plurality of pigment molecules can be exemplified, which is therefore distinguished from a simple mixture of two or more types of pigments.

The compound represented by the following General Formula (A) is exemplified as a quinacridone-based compound.

$$X_n\text{-}Q\text{-}Y_m \quad (A)$$

In General Formula (A) above, Q represents a quinacridone residue or a quinacridone quinone residue. X and Y respectively independently represent a hydrogen atom, a methyl group, a chloro group, or a methoxy group, and m and n respectively independently represent an integer of 1 to 4.

Specific examples of the quinacridone-based compound represented by General Formula (A) above include an unsubstituted quinacridone, 2,9-dimethylquinacridone, 2,9-dichloroquinacridone, 2,9-dimethoxyquinacridone, 3,10-dimethylquinacridone, 3,10-dichloroquinacridone, 3,10-dimethoxyquinacridone, 4,11-dimethylquinacridone, 4,11-dichloroquinacridone, 4,11-dimethoxyquinacridone, quinacridone quinone, and the like.

A favorable example of the quinacridone solid solution pigment is a solid solution pigment including at least two selected from a group consisting of an unsubstituted quinacridone, a dimethyl-substituted quinacridone, and a dichloro-substituted quinacridone from the viewpoint of the color phase and color reproduction region. More specifically, for the same reasons as above, (1) a solid solution pigment of an unsubstituted quinacridone and a dimethyl-substituted quinacridone (example: 2,9-dimethylquinacridone or the like), (2) a solid solution pigment of an unsubstituted quinacridone and a dichloro-substituted quinacridone (example: 2,9-dichloroquinacridone, 3,10-dichloroquinacridone, or the like), (3) a solid solution pigment of a dimethyl-substituted quinacridone (example: 2,9-dimethylquinacridone or the like) and a dichloro-substituted quinacridone (example: 2,9-dichloroquinacridone, 3,10-dichloroquinacridone, or the like), or the like can be exemplified.

Of the above, from the viewpoints of the color phase and the color reproduction region, (1) a solid solution pigment of an unsubstituted quinacridone and a dimethyl-substituted quinacridone and (2) a solid solution pigment of an unsubstituted quinacridone and a dichloro-substituted quinacridone are preferable. More specifically, from the viewpoint of the color phase, a solid solution pigment of an unsubstituted quinacridone (C.I. Pigment Violet 19 or the like) and 2,9-dimethylquinacridone (C.I. Pigment Red 122 or the like), and a solid solution pigment of an unsubstituted quinacridone (C.I. Pigment Violet 19 or the like) and 2,9-dichloro-substituted quinacridone (C.I. Pigment Red 202 or the like) are preferable. A solid solution pigment of an unsubstituted quinacridone (C.I. Pigment Violet 19 or the like) and 2,9-dichloro substituted quinacridone (C.I. Pigment Red 202) is more preferable.

Here, while any of an α type, a β type, or a γ type may be used as the unsubstituted quinacridone, a β type or γ type unsubstituted quinacridone is preferable from the viewpoint of preservation stability. For example, the solid solution magenta pigment described in JP1998-219166A (JP-H10-219166A) may be used.

From the viewpoints of the discharge reliability, the image density, the saturation, and the like of the ink composition, the mass ratio between the unsubstituted quinacridone and the dimethyl-substituted quinacridone, the mass ratio between the unsubstituted quinacridone and the dichloro-substituted quinacridone, and the mass ratio between the dimethyl-substituted quinacridone and the dichloro-substituted quinacridone in the quinacridone solid solution pigment are preferably 5:95 to 95:5, and more preferably 10:90 to 90:10.

The quinacridone solid solution pigment can be manufactured by a commonly known method.

For example, (i) a method of dissolving a crude unsubstituted quinacridone and a quinacridone-based compound in an aprotic polar organic solvent in the presence of a caustic alkali and neutrally-reprecipitating the mixture in acid (for details, refer to the description of JP1985-35055A (JP-S60-35055A)), (ii) a method of pulverizing a coarse or auxiliary pigment quinacridone compound in the presence of alcohol and a base of a solubilization amount and isolating the solid solution that is obtained (for details, refer to JP1990-38463A (JP-H2-38463A)), and (iii) a method of performing a pigmentation process (control of the crystalline form, size and crystal type) after condensing and cyclizing two or more types of 2,5-diarylamino terephthalic acid derivatives (for details, refer to JP1998-219166A (JP-H10-219166A)), and the like can be exemplified.

The form of the quinacridone solid solution pigment may be any of a dry pigment in a powder form, a granular form, or a massive form, and may also be a wet cake or a slurry.

Further, from the viewpoint of preservation stability, the average particle diameter of the quinacridone solid solution pigment is preferably 0.01 to 0.3 μm and more preferably 0.03 to 0.2 μm. Here, the average particle diameter is a value that is found from the average value of the long diameter of 100 pigment particles using image analysis (magnification of 20,000) with an electron microscope (TEM).

As the content ratio of the quinacridone solid solution pigment with respect to the total mass of the coloring particles, a range of equal to or greater than 10% by mass is preferable and a range of equal to or greater than 20% is more preferable.

Further, as the content amount of the quinacridone solid solution in the ink composition with respect to the total mass of the ink composition, 1 to 15 mass % is preferable and 2 to 8 mass % is more preferable. By the content amount of the quinacridone solid solution pigment being equal to or greater than 1 mass %, the color phase and the color reproduction region are more favorable, and by the content amount being equal to or less than 15 mass %, the dispersibility and the stability thereof are maintained to be favorable, which are advantageous.

The solid solution pigment can be verified using X-ray diffraction analysis. That is, while a solid solution pigment has a diffraction pattern unique to the crystals which is different from the X-ray diffraction pattern of a mere pigment mixture, with a mere pigment mixture, the X-ray diffraction pattern is a pattern that corresponds to an overlap of the respective X-ray diffraction patterns of the pigments, and the peak strength thereof is also proportional to the mixing ratio of the plurality of pigments.

It is therefore possible to distinguish a solid solution pigment from a mere pigment mixture.

(Synergist)

The coloring particles in the present invention contain at least one type of synergist including a basic group. While a solid solution pigment generally has poor adhesiveness of the resin that covers the pigment and therefore has inferior dispersibility in an aqueous solvent compared to a single pigment, by including a synergist along with a high-molecular weight vinyl polymer described later, the poor adhesiveness due to the solid solution pigment, that is, the adhesion of the polymer that covers the surface of the solid solution pigment, is improved, and the dispersibility of a composition using a solid solution pigment and the stability thereof are greatly improved.

A synergist refers to a pigment derivative including a partial structure that is similar to the chemical structure of the coloring material that forms the pigment and at least one type of hydrophilic group. In the present invention, at least one type of the hydrophilic group is a basic group.

The synergist according to the present invention is adsorbed to the solid solution pigment through, for example, a hydrophobic interaction or a π-π interaction, and the pigment surface can be made basic through the basic group that the synergist includes. Here, for example, in a case where a high-molecular weight vinyl polymer including an anionic group is used as a pigment dispersant, the affinity between the pigment and the pigment dispersant can be increased, and the dispersion stability of the pigment can be more effectively improved.

The basic group refers to a group that is formed by removing at least one atom from the basic compound. Examples of basic compounds include a secondary or tertiary monoamine, a diamine, a saturated cyclic amine, an unsaturated cyclic amine, a carboxyl group-containing saturated cyclic amine, a carboxyl group-containing unsaturated cyclic amine, a hydroxyl group-containing saturated cyclic amine, a hydroxyl group-containing unsaturated cyclic amine, and a cyclic diamine.

Specific examples of the basic compound include dimethylamine, diethylamine, dibutyl ethyl amine, dicyclohexyl amine, N,N-dimethylaminoethylamine, N-methylpiperazine, 1-amino-4-methyl piperazine, 1-cyclopentylpiperazine, 2,6-lupetidine, 3-piperidinemethanol, pipecolic acid, isonipecotic acid, isonipecotic acid methyl, 2-piperidineethanol, piperidine, 2-pipecoline, pyrrolidine, 3-hydroxypyrrolidine, N-aminoethylpiperidine, N-aminoethylmorpholine, N-aminopropylpiperidine, N-aminopropylmorpholine, and the like.

From the viewpoint of the stability of the dispersion state after time, it is preferable that the basic group be at least one selected from at least one of a dialkylamino group, a morpholino group, a piperazinyl group, a pyrrolidinyl group, a piperidinyl group, a pyridyl group, and a triazinyl group.

Further, the basic group including a synergist according to the present invention may be one type or two or more types.

The partial structure that is similar to the chemical structure of the coloring material that forms the pigment is not particularly limited as long as the partial structure is similar to a compound that can form the pigment. From the viewpoint of adsorbability on the pigment, one type or two or more types selected from a quinacridone derivative, a triazine derivative, an acridone derivative, and an anthraquinone derivative is preferable as the compound that configures the partial structure, the quinacridone derivative and the triazine derivative are more preferable, and the quinacridone derivative is even more preferable.

While the synergist according to the present invention has a partial structure that is similar to the chemical structure of the coloring material that forms the pigment and at least one type of basic group, the synergist may also include other substituents in addition to the basic group. Examples of other substituents include an alkyl group (for example, a methyl group, an ethyl group, a propyl group, a butyl group, and the like), a hydroxyl group, an alkoxy group (for example, a methoxy group, an ethoxy group, a butoxy group, and the like), a halogen atom (for example, a fluorine atom, a chlorine atom, a bromine atom, and the like), a phenyl group, and the like. The synergist according to the present invention may include one of the other substituents or two or more types in combination.

As the synergist according to the present invention, a variety of synergists can be synthesized easily in accordance with the synthesis methods described in JP2003-43680A and JP2007-131832A, for example. As a specific synthetic route, a synergist can be obtained by introducing a reactive substituent (for example, an acid halide or an alkyl halide) to a quinacridone derivative, a triazine derivative, an acridone derivative, or an anthraquinone derivative and causing the reactive substituent to react with a compound including a basic substituent (for example, N,N-dimethylaminoethylamine or the like).

In particular, it is preferable that the synergist according to the present invention include at least one basic group selected from a dialkylamino group, a morpholino group, a piperazinyl group, a pyrrolidinyl group, a piperidinyl group, a pyridyl group, and a triazinyl group, and a structural moiety derived from a quinacridone derivative, a triazine derivative, an acridone derivative, or an anthraquinone group.

From the viewpoint of dispersion stability, the content ratio of the synergist including a basic group is preferably within a range of equal to or greater than 0.05% and equal to or less than 0.4% with respect to a high-molecular weight vinyl polymer by mass, and more preferably within a range of equal to or greater than 0.1% and equal to or less than 0.3%.

Further, from the viewpoint of dispersion stability, the content amount of the synergist including a basic group in the ink composition is preferably 0.5 to 20 parts by mass with respect to 100 parts by mass of the solid solution pigment, and more preferably 1 to 10 parts by mass. By the content amount of the synergist being equal to or greater than 0.5 parts by mass, the dispersibility of the solid solution pigment in an aqueous medium and the stability thereof improve further. Further, it is advantageous in terms of the discharge ability that the content amount of the synergist is equal to or less than 20 parts by mass.

(High-Molecular Weight Vinyl Polymer)

The coloring particles according to the present invention contain at least one type of high-molecular weight vinyl polymer. The high-molecular weight vinyl polymer functions as a dispersant of the solid solution pigment, and the coloring particles are formed by the high-molecular weight vinyl polymer covering the surface of the solid solution pigment which is modified by the synergist. In so doing, the dispersibility of the solid solution pigment becomes favorable.

From the viewpoints of conferring self-dispersibility, the agglomeration speed when a treatment liquid that agglomerates the components within the ink composition is used, and the like, a polymer including a hydrophilic group (a disassociable group or the like such as a carboxyl group) is preferable as the high-molecular weight vinyl polymer of the present invention. Furthermore, a high-molecular weight vinyl polymer including a hydrophilic group (a disassociable group or the like such as a carboxyl group) and which has an acid value of equal to or less than 100 mg KOH/g is more preferable, and a range of acid value of 25 to 100 mg KOH/g is particularly preferable.

In particular, high-molecular weight vinyl polymer including a constituent unit that is derived from a hydrophilic group-containing monomer and a constituent unit that is derived from an aromatic group-containing monomer as a hydrophobic group is preferable as the high-molecular weight vinyl polymer according to the present invention, and a high-molecular weight vinyl polymer including a constituent unit that is derived from a disassociable group-containing monomer and a constituent unit that is derived from an aromatic group-containing monomer is preferable.

Examples of the hydrophilic group-containing monomer include monomers that contain disassociable groups such as a carboxyl group, a phosphoric acid group, and a sulfonic acid group, and specifically, an unsaturated carboxylic acid monomer, an unsaturated sulfonic acid monomer, an unsaturated phosphoric acid monomer, and the like are exemplified. Among the above, an unsaturated carboxylic acid monomer is preferable, specific examples of which include acrylic acid, methacrylic acid, crotonic acid, itaconic acid, maleic acid, fumaric acid, citraconic acid, 2-methacryloyloxy methyl succinic acid, and the like.

It is preferable that the aromatic group-containing monomer be a monomer including an aromatic group that is derived from an aromatic hydrocarbon and ethylenically unsaturated bonds. Examples of aromatic group-containing monomers include phenoxyethyl(meth)acrylate, benzyl(meth)acrylate, phenyl(meth)acrylate, a styrene-based monomer, and the like. In particular, from the viewpoints of a balance between the hydrophilicity and the hydrophobicity of the polymer chain and the ink adhesiveness, an aromatic group-containing (meth)acrylate monomer is preferable, a compound selected from phenoxyethyl(meth)acrylate, benzyl(meth)acrylate, and phenyl(meth)acrylate is more preferable, and phenoxyethyl(meth)acrylate and benzyl(meth)acrylate are even more preferable.

Here, "(meth)acrylate" refers to an acrylate or a methacrylate.

Among the above, a copolymer including at least one type of hydrophobic structure unit that is derived from at least one of phenoxyethyl acrylate and phenoxyethyl methacrylate and at least one type of hydrophilic structure unit that is derived from at least one of acrylic acid and methacrylic acid is preferable as the high-molecular weight vinyl polymer according to the present invention. By the high-molecular weight vinyl polymer having such a structure, the dispersion stability of the ink is improved further.

The high-molecular weight vinyl polymer may further include, in addition to the hydrophobic structure unit that is derived from at least one of phenoxyethyl acrylate and phenoxyethyl methacrylate and the hydrophilic structure unit that is derived from at least one of acrylic acid and methacrylic acid, a structure unit that is derived from a compound (hereinafter may be referred to as "another monomer") that is polymerizable with such monomers. An example of the structure unit that is derived from another monomer is a structure unit that is derived from a monomer including an $\alpha,\beta$-ethylenically unsaturated group.

Specific examples of the monomer including an $\alpha,\beta$-ethylenically unsaturated group include ethylene, propylene, butene, pentene, hexene, vinyl acetate, allyl acetate, crotonic acid, crotonic acid ester, itaconic acid, itaconic acid monoester, maleic acid, maleic acid monoester, maleic acid diester, fumaric acid, fumaric acid monoester, vinyl sulfonic acid, styrene sulfonic acid, sulfonated vinyl naphthalene, vinyl alcohol, acrylamide, methacryloxy ethyl phosphate, bis methacryloxy ethyl phosphate, methacryloxy ethyl phenyl acid phosphate, ethylene glycol dimethacrylate, diethylene glycol dimethacrylate, styrene derivatives such as styrene, $\alpha$-methyl styrene, and vinyl toluene, vinyl cyclohexane, vinyl naphthalene, a vinyl naphthalene derivative, acrylic acid alkyl ester and acrylic acid phenyl ester that may be substituted with an aromatic group, methacrylic acid alkyl ester, methacrylic acid phenyl ester, methacrylic acid cycloalkyl ester, crotonic acid alkyl ester, itaconic acid dialkyl ester, maleic acid dialkyl ester that may be substituted with an aromatic group, vinyl alcohol, derivatives of the compounds described above, and the like.

In particular, acrylic acid alkyl ester, methacrylic acid alkyl ester (both alkyl esters that may be substituted with an aromatic group, and preferably both with 1 to 4 carbon atoms in the alkyl portion), or acrylic acid phenyl ester is preferable as the other monomer.

The high-molecular weight vinyl polymer according to the present invention is preferably obtained by polymerizing a monomer mixture including at least one of phenoxyethyl acrylate and phenoxyethyl methacrylate, at least one of acrylic acid and methacrylic acid, and at least one of acrylic acid alkyl ester and methacrylic acid alkyl ester (preferably both alkyl esters with 1 to 4 carbon atoms in the alkyl portion) using a known polymerization method. The high-molecular weight vinyl polymer may be manufactured, for example, using a solution polymerization method or the like.

In a case where a solution polymerization is used, while the solvent is not particularly limited, a polar organic solvent is preferable. In a case where the polar organic solvent is water-miscible, the solvent may be used mixed with water. Examples of polar organic solvents include methanol, ethanol, propanol, acetone, methyl ethyl ketone, and ethyl acetate.

When polymerizing the monomer mixture, a radical polymerization initiator may be used. Azo compounds such as 2,2'-azobisisobutyronitrile and 2,2'-azobis(2,4-dimethylvaleronitrile) or organic peroxides such as t-butylperoxy octoate, di-t-butyl peroxide, and dibenzoyl peroxide may be used as the radical polymerization initiator. According to the present invention, it is preferable that an azo compound be used.

Furthermore, a polymerization chain transfer agent mat be added when copolymerizing. Specific examples of polymerization chain transfer agents include octyl mercaptan, n-dodecyl mercaptan, t-dodecyl mercaptan, n-tetradecyl mercaptan, mercaptoethanol, 3-mercapto-1,2-propanediol, mercaptosuccinic acid, thiuram disulfide, and the like.

The polymerization temperature is preferably 30 to 100° C. and more preferably 50 to 80° C., and the polymerization time is preferably 1 to 20 hours. Further, it is preferable that the polymerization atmosphere be a nitrogen gas atmosphere or an inert gas atmosphere such as argon.

After the polymerization reaction, the generated water-insoluble vinyl polymer can be isolated from the reaction solution using a known method such as reprecipitation and solvent distillation. Further, the obtained water-insoluble polymer can be purified by removing unreacted monomers and the like using methods such as reprecipitation, membrane separation, and extraction.

The high-molecular weight vinyl polymer according to the present invention preferably has a content ratio of the hydrophobic structure unit that is derived from at least one of phenoxyethyl acrylate and phenoxyethyl methacrylate of 20 to 90 mass %, and more preferably 30 to 90 mass %. Further, the content ratio of the hydrophilic structure unit that is derived from at least one of acrylic acid and methacrylic acid is preferably 5 to 40 mass % and more preferably 5 to 30 mass %.

Further, the average molecular weight of the high-molecular weight vinyl polymer according to the present invention is preferably a weight-average molecular weight of 2,000 to 70,000 and more preferably 20,000 to 60,000. Here, the weight-average molecular weight is a polystyrene-converted average molecular weight which is measured using gel permeation chromatography (carrier: tetrahydrofuran). In detail, the weight-average molecular weight of the high-molecular weight vinyl polymer is a molecular weight that is represented by being converted using a GPC analysis device with columns of TSKgel GMHxL, TSKgel G4000HxL, and TSKgel G2000HxL (all product names manufactured by Tosoh Corporation), using tetrahydrofuran as the solvent, detection using a differential refractometer, and using polystyrene as the standard substance.

Furthermore, the high-molecular weight vinyl polymer according to the present invention preferably has a content ratio of the hydrophobic structure unit that is derived from at least one of phenoxyethyl acrylate and phenoxyethyl methacrylate of 20 to 90 mass %, a content ratio of the hydrophilic structure unit that is derived from at least one of acrylic acid and methacrylic acid of 5 to 40 mass %, and a weight-average molecular weight of 2,000 to 70,000, and more preferably has a content ratio of the hydrophobic structure unit that is derived from at least one of phenoxyethyl acrylate and phenoxyethyl methacrylate of 30 to 90 mass %, a content ratio of the hydrophilic structure unit that is derived from at least one of acrylic acid and methacrylic acid of 5 to 30 mass %, and a weight-average molecular weight of 20,000 to 60,000. In addition to the above, a structure unit that is derived from at least one of acrylic acid alkyl ester and methacrylic acid alkyl ester (preferably both alkyl esters with 1 to 4 carbon atoms in the alkyl portion) is preferably further included.

While the manufacturing method of the coloring particles according to the present invention is not particularly limited, for example, the coloring particles can be manufactured, for example, using a manufacturing method of a capsulized pigment described in JP1998-140065A (JP-H10-140065A). Specifically, an aqueous dispersant of the coloring particles can be obtained by removing at least a portion of an organic solvent after dispersion processing the high-molecular weight vinyl polymer, the quinacridone solid solution pigment, and the synergist including a basic group in an aqueous medium including the organic solvent.

From the viewpoint of dispersion stability, the content ratio of the high-molecular weight vinyl polymer with respect to the solid solution pigment is preferably within a range of equal to or greater than 10% and equal to or less than 100% by mass and more preferably within a range of equal to or greater than 30% and equal to or less than 60%.

Further, from the viewpoint of the image density, the content ratio of the coloring particles in the ink composition with respect to the total mass of the ink composition is preferably equal to or greater than 2 mass % and equal to or less than 10 mass %, and more preferably equal to or greater than 3 mass % and equal to or less than 7 mass %.

—Polymerizable Compound—

The ink composition of the present invention contains at least one type of water-soluble polymerizable compound. The polymerizable compound is polymerized by being irradiated by active energy rays. The polymerizable compound is used along with the pigment and resin particles, and when agglomerated by being in contact with the treatment liquid, the polymerizable compound is taken in between the particles, and strengthens an image by the polymerization curing that follows.

Water solubility refers to the ability of being dissolved in water at a certain concentration or greater, and refers to a substance that can be (desirably evenly) dissolved in water-based ink or treatment liquid. Further, water-soluble may also refer to a substance that can be dissolved (desirably evenly) in ink due to the solubility rising by a water-soluble organic solvent described later being added. Specifically, it is preferable that solubility with respect to water (25° C.) be equal to or greater than 10 mass %, and equal to or greater than 15 mass % is more preferable.

From the viewpoint of not preventing the reaction between the agglomeration components and the pigment and the resin particles, a nonionic or cationic polymerizable compound is preferable as the polymerizable compound, and a polymerizable compound with solubility with respect to water of equal to or greater than 10 mass % (more preferably equal to or greater than 15 mass %) is preferable.

Examples of nonionic polymerizable monomers include polymerizable compounds such as (meth)acryl monomers.

Examples of the (meth)acryl monomers include ultraviolet curable monomers and oligomers such as polyvalent alcohol (meth)acrylic acid ester, polyvalent alcohol glycidyl ether (meth)acrylic acid ester, polyethylene glycol (meth)acrylic acid ester, polyvalent alcohol ethylene oxide-added compound (meth)acrylic acid ester, and reactants between polybasic acid anhydride and hydroxyl-containing (meth)acrylic acid ester.

The chain of the polyvalent alcohol may be extended by an ethylene oxide chain on the inside by the addition of ethylene oxide.

Specific examples of the nonionic polymerizable compound (nonionic compounds 1 to 6) will be shown below. However, the present invention is not limited to such examples

[Chem. 2]

Nonionic Compound 1

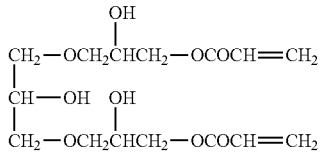

Nonionic Compound 2

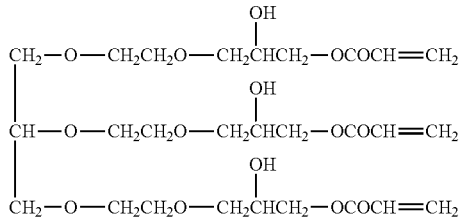

Nonionic Compound 3

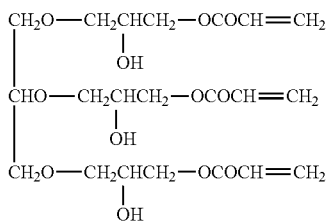

Nonionic Compound 4

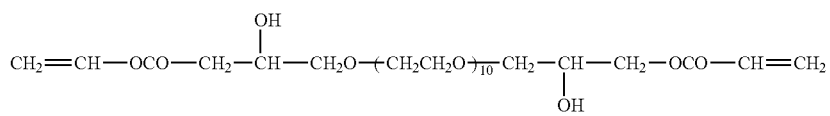

Nonionic Compound 5

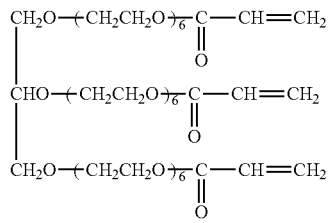

Nonionic Compound 6

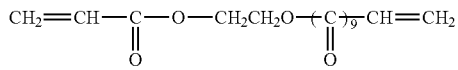

Further, acrylic acid ester including two or more acryloyl groups in one molecule that is derived from a multi-hydroxyl compound may also be used. Examples of the multi-hydroxyl compounds include condensates of glycols, oligo ethers, oligo esters, and the like.

Furthermore, as the nonionic polymerizable compound, a (meth)acrylic acid ester of a polyol including two or more hydroxyl groups such as a monosaccharide or a disaccharide or a (meth)acrylic acid ester of triethanolamine, diethanolamine, trishydroxymethylaminomethane, trishydroxymethylaminoethane, or the like is preferable.

Further, a water-soluble polymerizable compound with an acrylamide structure within the molecule is also preferable as the nonionic polymerizable compound. The compound represented by the following General Formula (1) is more preferable as the polymerizable compound with an acrylamide structure within the molecule

[Chem. 3]

General Formula (1)

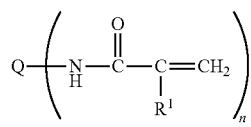

In General Formula (1), Q represents an n-valent group and $R^1$ represents a hydrogen atom or a methyl group. Further, n represents an integer of equal to or greater than 1.

The compound represented by General Formula I has an unsaturated vinyl monomer that is bonded to the group Q with an amide bond. $R^1$ represents a hydrogen atom or a methyl group, and is preferably a hydrogen atom. The valence n of the group Q is equal to or greater than 1 from the viewpoint of improving the polymerization efficiency and the discharge stability, and in particular, equal to or greater than 1 and equal to or less than 6 is preferable, and equal to or greater than 1 and equal to or less than 4 is more preferable. Further, it is preferable that a multi-functional (meth)acrylamide in which with excellent polymerization efficiency be included, and furthermore, it is preferable that a multi-functional (meth)acrylamide in which n=1 with excellent permeability and a multi-functional (meth)acrylamide in which n2 with excellent polymerization efficiency be used together.

Further, while the group Q is not particularly limited as long as the group Q is a group that can be linked with a (meth)acrylamide structure, it is preferable that the compound represented by General Formula (1) be selected from a group that satisfies the water solubility described above. Specifically, a residue in which one or more hydrogen atoms or hydroxyl groups are removed from a compound selected from the following compound group X can be exemplified.

—Compound Group X—

Polyols such as ethylene glycol, diethylene glycol, triethylene glycol, polyethylene glycol, propylene glycol, dipropylene glycol, tri propylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thio glycol, trimethylolpropane, ditrimethylolpropane, trimethylolethane, ditrimethylolethane, neopentyl glycol, pentaerythritol, dipentaerythritol, condensates thereof, low-molecular weight polyvinyl alcohol, or sugars.

Polyamines such as ethylenediamine, diethylenetriamine, triethylenetetramine, polyethylene imine, and polypropylene diamine.

Furthermore, a functional group including a substituted or unsubstituted alkylene chain with 4 carbon atoms or less such as a methylene, ethylene, propylene, or butylene group, or a saturated or unsaturated hetero ring such as a pyridine ring, an imidazole ring, a pyrazine ring, a piperidine ring, a piperazine ring, or a morpholine ring, and the like can be exemplified.

When n=1, an alkyl group or a substituted alkyl group is preferable as the group Q, and the number of carbon atoms in the alkyl is preferably 1 to 5, and the number of carbon atoms is more preferably 1 to 3. Examples of the substituent in a case where the alkyl group is substituted include a hydroxyl group, an amino group, and the like.

Further, when n≥2, the group Q represents a linked group. The linked group is preferably a residue of a polyol including an oxyalkylene group (preferably an oxyethylene group), and is particularly preferably a residue of a polyol including three or more oxyalkylene groups (preferably oxyethylene groups).

Specific examples of the water-soluble polymerizable compound including an acrylamide structure in the molecule are shown below. However, the present invention is not limited to such examples.

[Chem. 4]
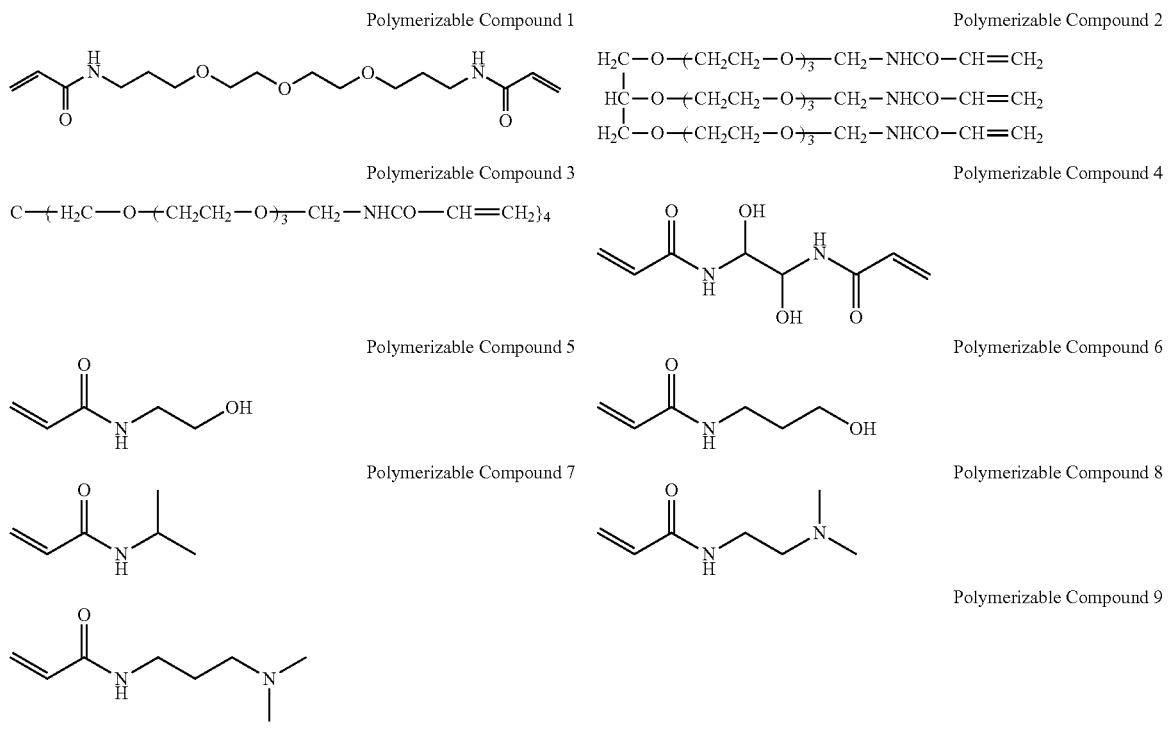
[Chem. 5]
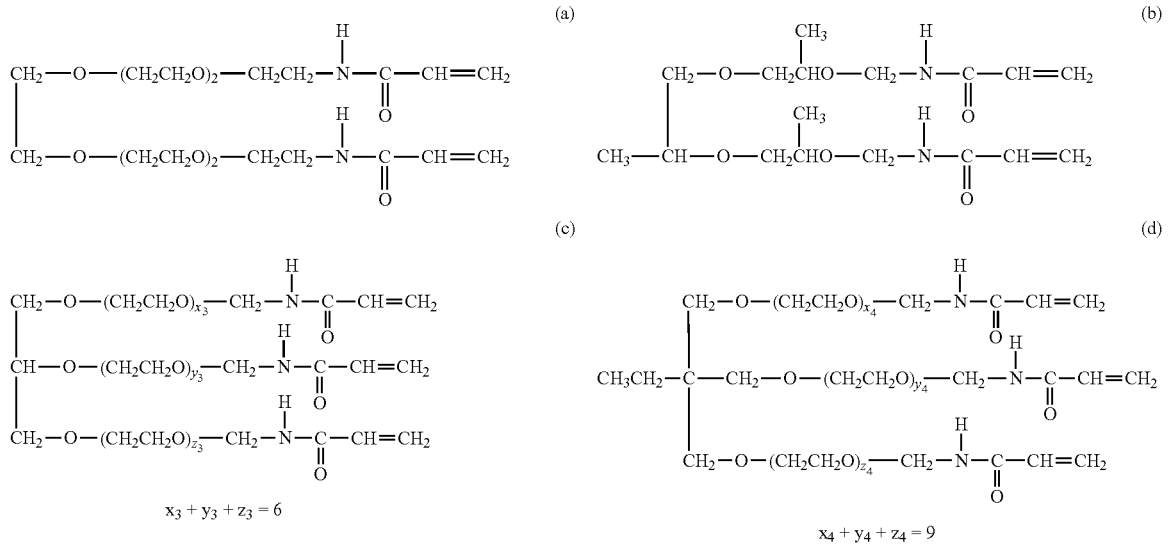
[Chem. 6]
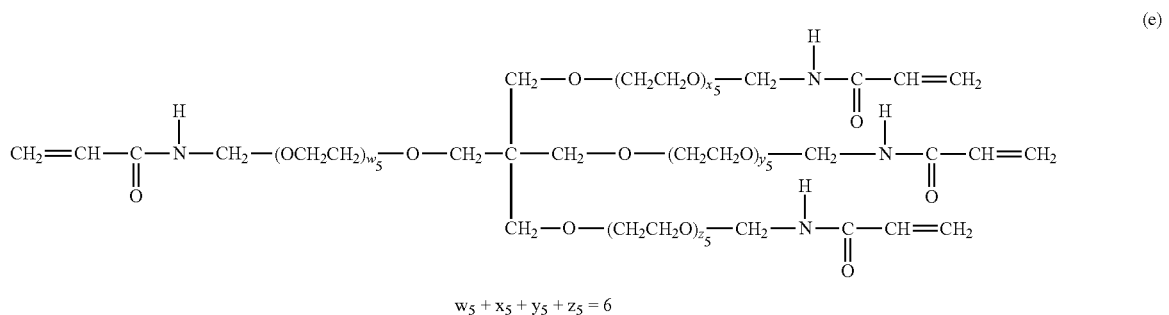

-continued
(f)
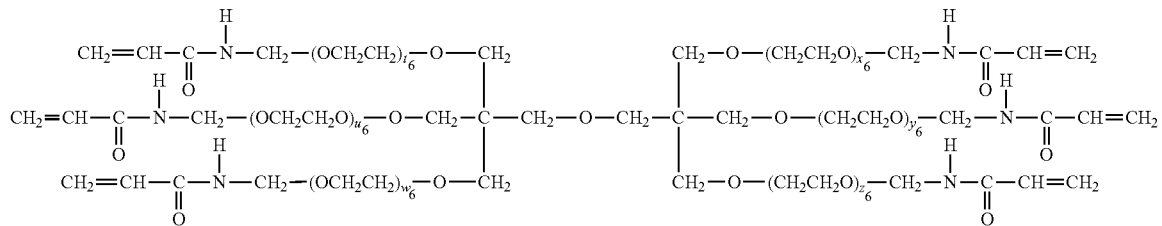
$t_6 + u_6 + w_6 + x_6 + y_6 + z_6 = 12$
(g)
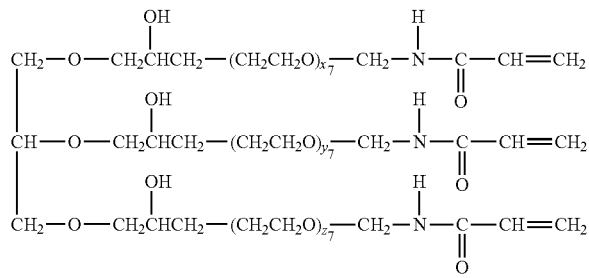
$x_7 + y_7 + z_7 = 3$
[Chem. 6]
(e)
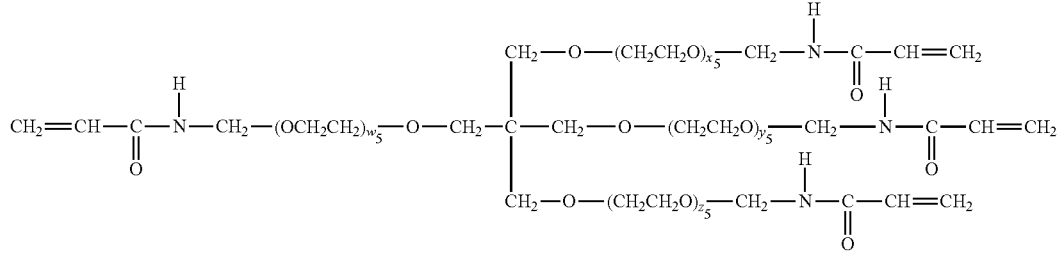
$w_5 + x_5 + y_5 + z_5 = 6$
(f)
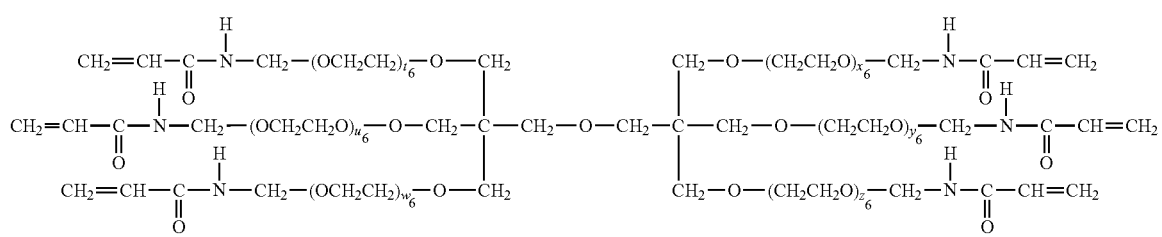
$t_6 + u_6 + w_6 + x_6 + y_6 + z_6 = 12$
(g)
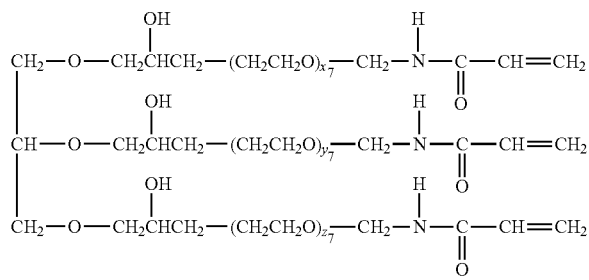
$x_7 + y_7 + z_7 = 3$ The cationic polymerizable compound is a compound including a cationic group and a polymerizable group such as an unsaturated double bond, and for example, an epoxy monomer, an oxetane monomer, or the like can be preferably used. If a cationic polymerizable compound is contained, the cationic property of the ink composition is strengthened by including a cationic group, and mixing of colors when an anionic ink is used is prevented more effectively.

Examples of the cationic polymerizable compound include N,N-dimethylaminoethyl methacrylate, N,N-dimethylaminoethyl acrylate, N,N-dimethylaminopropyl methacrylate, N,N-dimethylaminopropyl acrylate, N,N-dimethylamino acrylamide, N,N-dimethylamino methacrylamide, N,N-dimethylaminoethyl acrylamide, N,N-dimethylaminoethyl methacrylamide, N,N-dimethylaminopropyl acrylamide, N,N-dimethylaminopropyl methacrylamide, quaternary compounds thereof, and the like.

Examples of epoxy monomers include polyvalent alcohol glycidyl ether, glycidyl ester, aliphatic cyclic epoxide, and the like.

Furthermore, examples of the cationic polymerizable compound include the following structures

[Chem. 8]

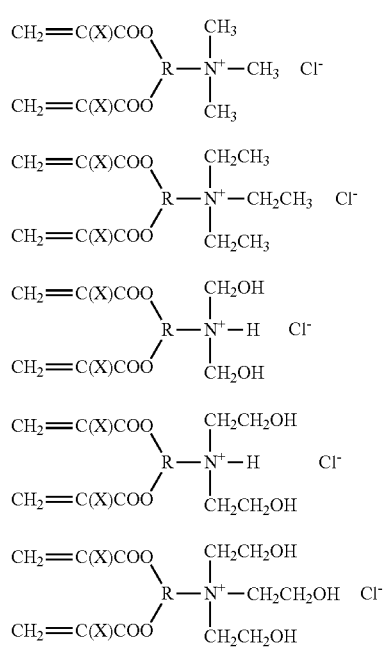

Structure 1

Structure 2

Structure 3

Structure 4

Structure 5

-continued

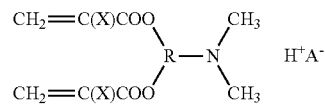

Structure 6

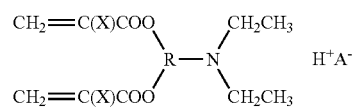

Structure 7

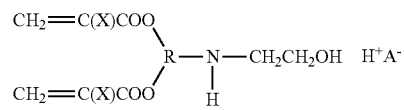

Structure 8

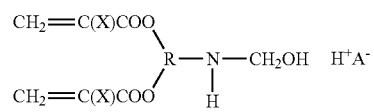

Structure 9

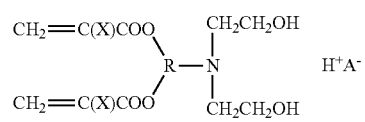

Structure 10

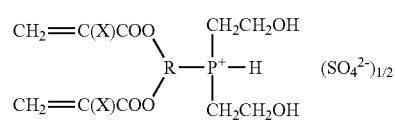

Structure 11

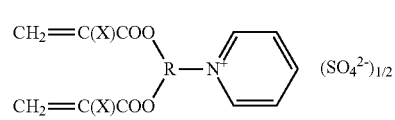

Structure 12

In the structures above, R represents a polyol residue. Further, X represents H or $CH_3$, and $A^-$ represents $Cl^-$, $HSO_3^-$, or $CH_3COO^-$. Examples of a compound for introducing the polyol include glycerin, 1,2,4-butanetriol, 1,2,5-pentanetriol, 1,2,6-hexanetriol, trimethylolpropane, trimethylolmethane, trimethylolethane, pentaerythritol, bisphenol A, alicyclic bisphenol A, condensates thereof, and the like.

Specific examples of polymerizable compounds that include a cationic group (Cationic Compounds 1 to 11) are shown below.

[Chem. 9]

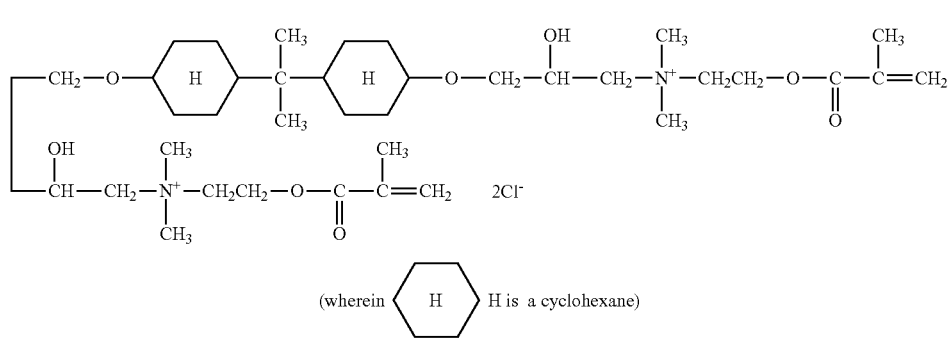

Cationic Compound 1

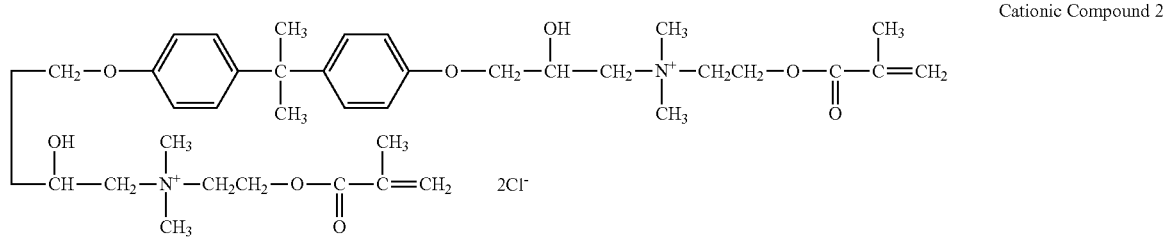
Cationic Compound 2
Cationic Compound 3
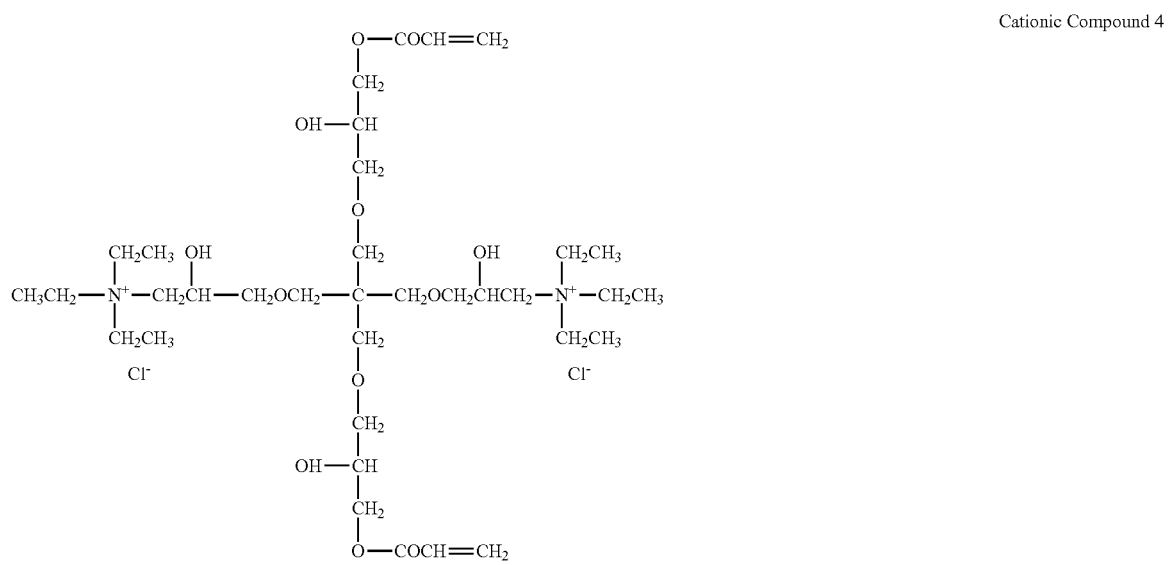
Cationic Compound 4
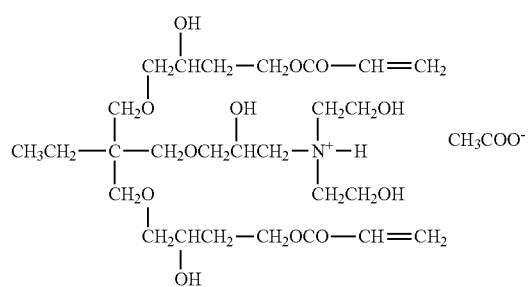
Cationic Compound 5
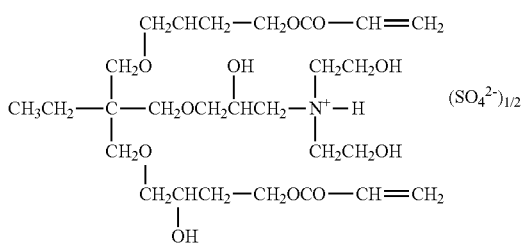
Cationic Compound 6

-continued

Cationic Compound 7

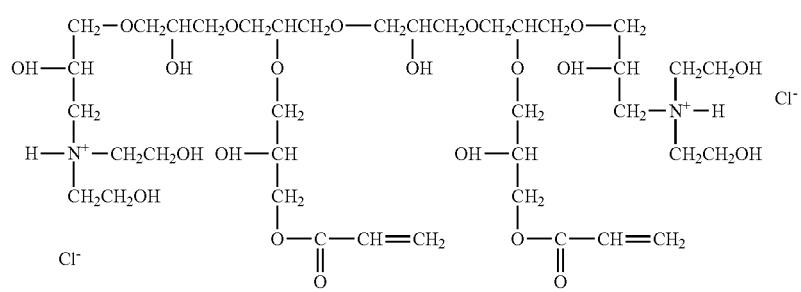

Cationic Compound 8

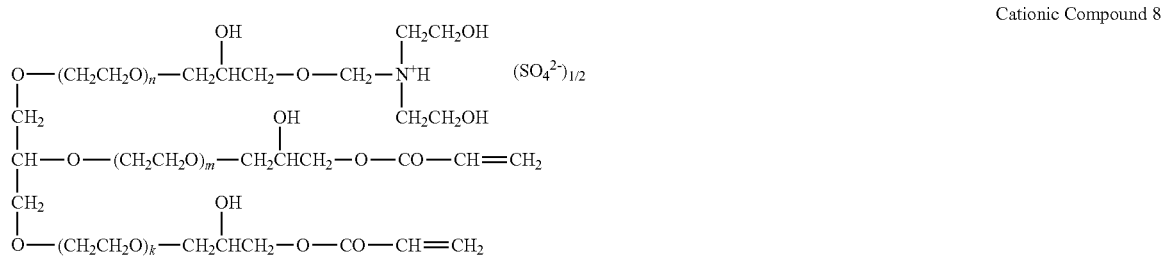

n + m + k = 15

Cationic Compound 9

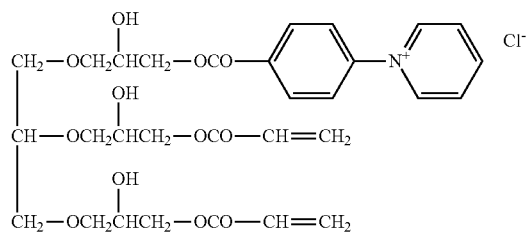

Cationic Compound 10

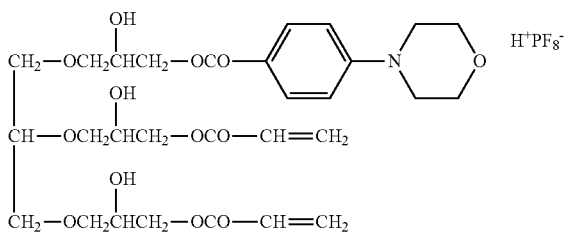

Cationic Compound 11

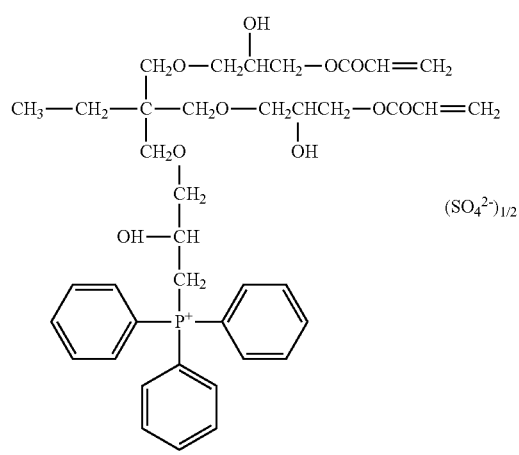

From the viewpoint of being able to increase abrasion resistance, a multi-functional monomer is preferable as the polymerizable compound according to the present invention, a monomer with two to six functions is preferable, and from the viewpoint of realizing both solubility and abrasion resistance, a monomer with two to four functions is preferable.

The content ratio [q:p [mass ratio]] between the polymerizable compound (p) according to the present invention and the quinacridone solid solution pigment (q) described earlier, 1:1 to 1:20 is preferable, 1:1 to 1:10 is more preferable, and 1:1 to 1:5 is even more preferable. If the content ratio (q:p) is equal to or greater than 1:1, that is, if the ratio of the polymerizable compound is within a range of not being too low with respect to the solid solution pigment, the adhesiveness of the image is better. Further, it is advantageous in terms of discharge ability if the content ratio (q:p) is equal to or less than 1:20, that is, if the ratio of the polymerizable compound is within a range of not being too large with respect to the solid solution pigment.

One type of polymerizable compound or two or more types in combination may be contained.

It is preferable that the content amount of the polymerizable compound in the ink composition with respect to the total mass of the ink composition be equal to or greater than 15 mass % and less than 40 mass %, and equal to or greater than 15 mass % and equal to or less than 25 mass % is more preferable. If the content amount of the polymerizable compound is equal to or greater than 15 mass %, adhesiveness with the recording medium is improved and the image strength increases further, improving the abrasion resistance of the image. It is advantageous in terms of unevenness (pile height) of the image that the content amount of the polymerizable compound be equal to or less than 40 mass %.

—Polymerization Initiator—

The ink composition of the present invention is able to contain at least one type of polymerization initiator, which is contained or is not contained in a treatment liquid described later, which initiates polymerization of the polymerizable compound using active energy rays. The polymerization initiator may be used alone, by mixing two or more types, or using together with a sensitizer.

As the polymerization initiator, a compound that can start the polymerization reaction of the polymerizable compound using active energy rays can be selected as appropriate and is contained. Examples of polymerization initiators include polymerization initiators (for example, photopolymerization initiators and the like) that generate active species (radicals, acids, bases, and the like) using radiation, light, or electron beams.

Examples of photopolymerization initiators include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzyl, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethylthiuram monosulfide, thioxanthone, 2-chloro thioxanthone, 2-methyl thioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, 1-(4-isopropylphenyl)-2-hydroxy-2-methyl propane-1-one, and methylbenzoyl formate. Furthermore, examples also include aromatic diazonium salts such as triphenylsulfonium hexafluorophosphate and diphenyliodonium hexafluoroantimonate, aromatic halonium salts, aromatic sulfonium salts, metallocene compounds, and the like.

Further, examples of the polymerization initiator include the compound represented by the following General Formula (2), the compound described in JP2005-307198A, and the like. Among such examples, from the viewpoint of adhesiveness and abrasion resistance, the polymerization initiator represented by the following General Formula (2) is preferable

[Chem. 13]

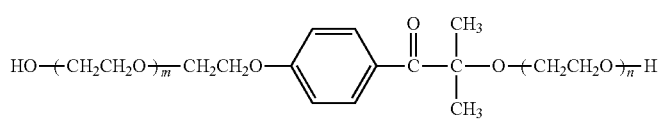

(2)

In General Formula (2), m and n respectively independently represent an integer of equal to or greater than 0, and m+n represents an integer of 0 to 3. It is preferable that m be 0 to 3 and n be 0 or 1, and it is more preferable that m be 0 or 1 and n be 0. A specific example of the compound represented by General Formula (2) is shown below. However, the present invention is not limited thereto.

[Chem. 14]

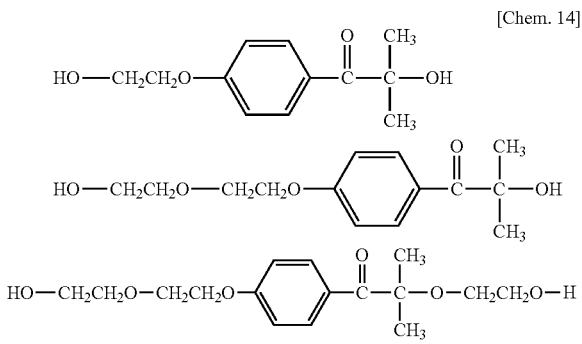

The compound represented by General Formula (2) may be a compound that is synthesized in accordance with the description of JP2005-307198A or the like or a commercially available compound. Irgacure 2959 (m=0, n=0) can be exemplified as a commercially available compound.

Further, the polymerization initiator according to the present invention is preferably a water-soluble polymerization initiator. Here, "water-soluble" refers to dissolving equal to or greater than 0.5 mass % in distilled water at 25° C., and a polymerization initiator that dissolves equal to or greater than 1 mass % in distilled water at 25° C. is preferable, and a polymerization initiator that dissolves equal to or greater than 3 mass % is more preferable.

In a case where the ink composition contains a polymerization initiator, the content amount of the polymerization initiator in the ink composition is preferably 0.07 to 0.2 mass % with respect to the polymerizable compound, and 0.1 to 0.17 mass % is more preferable. If the content amount of the polymerization initiator is equal to or greater than 0.07 mass %, the abrasion resistance of the image improves further, which is advantageous in high-speed recording, and a content amount is equal to or less than 0.2 mass % is advantageous in terms of discharge stability.

Examples of the sensitizer include an amine (an aliphatic amine, an amine including an aromatic group, piperidine, and the like), a urea (an allyl, o-tolylthio urea, and the like), a sulfur compound (sodium diethyl dithiophosphate, aromatic sulfinic acid soluble salt, and the like), a nitrile-based compound (N,N-di-substituted p-aminobenzonitrile, and the like), a phosphorous compound (tri-n-butylphosphine, sodium diethyl dithiophosphide, and the like), a nitrogen compound (Michler's ketone, a N-nitrosohydroxylamine derivative, an oxazolidine compound, a tetrahydro-1,3-oxazine compound, formaldehyde, a condensate of acetaldehyde and a diamine, and the like), a chlorine compound (carbon tetrachloride, hexachloroethane, and the like), an amine polymer of a reaction product between an epoxy resin and an amine, triethanolamine triacrylate, and the like.

The sensitizer may be contained within a range of not impairing the effect of the present invention.

—Water—

While the ink composition of the present invention contains water, the amount of water is not particularly limited. In particular, a preferable content amount of water is 10 to 99 mass %, more preferably 30 to 80 mass %, and even more preferably 45 to 70 mass %.

—Water-Soluble Organic Solvent—

The ink composition according to the present invention may also contain a water-soluble organic solvent. In a case where a water-soluble organic solvent is contained, the content amount is preferably small, and in the present invention, it is preferable that the content amount of the water-soluble organic solvent be less than 3 mass % with respect to the total mass of the ink composition. From the viewpoint of improving the solubility of the polymerizable compound, the lower limit of the content amount of the water-soluble organic solvent is desirably 0.5 mass %.

The water-soluble organic solvent has the effect of preventing drying of the ink composition and promoting wetting or permeation on paper. Examples of water-soluble organic solvents that the ink composition may include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol, polyvalent alcohols such as alkanediols such as 2-butene-1,4-diol, 2-ethyl-1,3-hexanediol, 2-methyl-2,4-pentanediol, 1,2-octanediol, 1,2-hexanediol, 1,2-pentanediol, 4-methyl-1,2-pentanediol, glycol ethers such as ethylene glycol monomethyl ether, ethylene glycol monoethyl ether, ethylene glycol monobutyl ether, ethylene glycol monomethyl ether acetate, diethylene glycol monomethyl ether, and diethylene glycol monoethyl ether, and the sugars and sugar alcohols, hyaluronic acids, alkyl alcohols with 1 to 4 carbon atoms, other glycol ethers, 2-pyrrolidone, N-methyl-2-pyrrolidone, and the like described in paragraph number [0116] of JP2011-42150A. One type or two or more types of the solvents may be used selectively as appropriate. Polyvalent alcohols are also useful as anti-drying agents and wetting agents, and for example, the example described in paragraph number [0117] of JP2011-42150A can also be exemplified. Further, a polyol compound is preferable as a wetting agent, and for example, the example described in paragraph number [0117] of JP2011-42150A can be exemplified as an aliphatic diol.

Other than the above, the compound represented by the following Structural Formula (1) can be exemplified as the water-soluble organic solvent.

[Chem. 15]

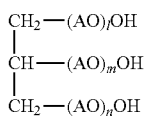

Structural Formula (1)

In Structural Formula (1), l, m, and n respectively independently represent an integer of equal to or greater than 1, and 1+m+n=3 to 15. In particular, if 1+m+n is equal to or greater than 3, a curling suppression effect is obtained, and if 1+m+n is equal to or less than 15, the discharge ability can be maintained to be favorable. In particular, 3 to 12 is preferable, and 3 to 10 is more preferable. AO represents one or both of ethyleneoxy (may be abbreviated to EO) and propyleneoxy (may be abbreviated to PO), and a propyleneoxy group is particularly preferable. Each AO of $(AO)_l$, $(AO)_m$, and $(AO)_n$ in the structural formula may be the same or different from one another.

Details of the compound represented by Structural Formula (1) above are described in paragraph numbers [0121] to [0125] in JP2011-42150A. A commercially available product may be used as a glycerin alkylene oxide adduct, and examples of polyoxypropylized glycerins (ether of polypropylene glycol and glycerin) include Sunnix GP-250 (average molecular weight 250), Sunnix GP-400 (average molecular weight 400), Sunnix GP-600 (average molecular weight 600) (all manufactured by Sanyo Chemical Industries, Ltd.), and the example described in paragraph number [0126] in JP2011-42150A.

—Other Components—

The ink composition according to the present invention can be configured using other additives other than the components described above. Examples of other additives include known additives such as a polymerization inhibitor, an anti-drying agent (wetting agent), an anti-fading agent, an emulsion stabilizer, a penetration enhancer, an ultraviolet absorbing agent, a preservative, a fungicide, a pH adjusting agent, a surface tension adjusting agent, a defoaming agent, a viscosity adjusting agent, a dispersion stabilizer, a rust inhibitor, and a chelating agent. While the various additives are generally added directly to the ink in the case of the ink composition and added to a dispersant after a dye dispersant is prepared in a case where an oil-based dye is used as a dispersant, the additives may be added to an oil phase or an aqueous phase during the preparation.

The ink composition according to the present invention is able to contain colloidal silica. A decrease in the liquid repellency of the ink jet head member can be prevented and the discharge ability can be increased. From such a viewpoint, the content amount of the colloidal silica in the ink composition of the present invention can be, for example, 0.0001 to 10 mass % with respect to the total sum of the ink composition.

The colloidal silica is a colloid made of minute particles of an inorganic oxide including silicon with an average particle diameter of equal to or less than several 100 nm. Silicon dioxide (including a hydrate thereof) may be included as the principal component, and aluminate may be included as a minor component. Examples of the aluminate that may be included as a minor component include sodium aluminate, potassium aluminate, and the like.

The colloidal silica may be manufactured by the manufacturing method described above or may be commercially available. Specific examples of commercially available silica include Ludox AM, Ludox AS, Ludox LS, Ludox TM, Ludox HS, and the like (all manufactured by E.I. du Pont de Nemours & Co); Snowtex S, Snowtex XS, Snowtex 20, Snowtex 30, Snowtex 40, Snowtex N, Snowtex C, Snowtex 0, and the like (all manufactured by Nissan Chemical Industries, Ltd.); Cataloid-S, Cataloid-F120, Cataloid SI-350, Cataloid SI-500, Cataloid SI-30, Cataloid S-20L, Cataloid S-20H, Cataloid S-30L, Cataloid S-30H, Cataloid SI-40, OSCAL-1432 (isopropyl alcohol sol), and the like (all manufactured by JGC Catalysts and Chemicals Ltd.); Adelite (manufactured by Adeka Corporation); and Snowtex ST-UP, Snowtex PS-S, Snowtex PS-M, Snowtex ST-OUP, Snowtex PS-SO, Snowtex PS-MO (all manufactured by Nissan Chemical Industries, Ltd.), and the like as beaded colloidal silica.

The description of paragraph numbers [0013] to [0019] in JP2011-063770A can be referenced for details of the colloidal silica.

Further, the ink composition according to the present invention can use various surfactants, and in particular, an aspect in which an acetylene glycol-based surfactant is contained is preferable.

Compared to other surfactants, an acetylene glycol-based surfactant can more easily maintain appropriate surface tension and interfacial tension between the ink and the ink jet head member (head nozzles and the like) that come into contact, and does not easily foam. The discharge stability when the ink composition is discharged can therefore be increased. Further, by including an acetylene glycol-based surfactant, permeability and wettability with respect to the recording medium becomes favorable, shade unevenness and bleeding of the ink are suppressed, which is advantageous in detailed image formation.

Examples of acetylene glycol-based surfactants include Surfynol 104, Surfynol 104E, Surfynol 104H, Surfynol 104A, Surfynol 104BC, Surfynol 104DPM, Surfynol 104PA, Surfynol 104PG-50, Surfynol 104S, Surfynol 420, Surfynol 440, Surfynol 465, Surfynol 485, Surfynol SE, Surfynol SE-F, Surfynol 504, Surfynol 61, Surfynol DF37, Surfynol CT111, Surfynol CT121, Surfynol CT131, Surfynol CT136, Surfynol TG and Surfynol GA (all manufactured by Air Products and Chemicals. Inc.), Olfin B, Olfin Y, Olfin P, Olfin A, Olfin STG Olfin SPC, Olfin E1004, Olfin E1010, Olfin PD-001, Olfin PD-002W, Olfin PD-003, Olfin PD-004, Olfin EXP.4001, Olfin EXP.4036, Olfin EXP.4051, Olfin AF-103, Olfin AF-104, Olfin AK-02, Olfin SK-14, Olfin AE-3 (all manufactured by Nissin Chemical Co., Ltd.), Acetylenol E00, Acetylenol E00P, Acetylenol E40, and Acetylenol E100 (all manufactured by Kawaken Fine Chemicals Co., Ltd.), and the like.

The content amount of the acetylene-based surfactant in the ink composition is preferably 0.1 to 1.5 mass % with respect to the total mass of the ink composition, and 0.5 to 1.0 mass % is more preferable. If the content amount is equal to or greater than 0.1 mass %, the ink tends to spread even on the medium, shade unevenness and bleeding of the ink are suppressed, and a more homogeneous image is obtained. If the content amount is equal to or less than 1.5 mass %, the preservation stability and discharge stability of the ink composition are better.

<Ink Set>

The ink set of the present invention is configured using the ink composition of the present invention described earlier and a treatment liquid including an agglomeration component that forms an agglomeration when coming into contact with the ink composition. Since the ink set of the present invention uses the ink composition described earlier and the treatment liquid together, the image that is formed has excellent detail and adhesiveness, and has excellent recoverability after being left for a period when use is interrupted or stopped, such as in long-term preservation or use in a high temperature environment.

Here, details of the ink composition are as described earlier.

—Treatment Liquid—

The treatment liquid that configures the ink set will be described in detail below.

When the treatment liquid that is applied to the recording medium comes into contact with the ink composition, the dispersed particles such as the coloring particles in the ink composition are agglomerated to fix an image on the recording medium. The treatment liquid contains at least an agglomeration component that agglomerates the components in the ink composition, may further include a polymerization initiator, and may be configured using other components according to need.

Further, by using the treatment liquid along with the ink composition, ink jet recording can be made high-speed, and an image with high density and resolution and excellent drawability (for example, reproducibility of thin lines and detailed portions) is obtained even with high-speed recording.

The agglomeration component may be a compound that can change the pH of the ink composition, a polyvalent metallic salt, a polymer including a quaternary or tertiary amine such as a polyallylamine. According to the present invention, from the viewpoint of the agglomeration ability of the ink composition, a compound that can change the pH of the ink composition is preferable, and a compound that can lower the pH of the ink composition is more preferable.

An acidic compound (hereinafter also referred to as an acidic substance) can be exemplified as a compound that can lower the pH of the ink composition.

Examples of acidic substances include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of such compounds or salts thereof, and the like.

An acidic substance may be used alone or two or more acidic substances may be used together.

In a case where the treatment liquid according to the present invention includes an acidic substance, the pH of the treatment liquid (25° C.) is preferably equal to or less than 6, and the pH is more preferably equal to or less than 4. In particular, the pH (25° C.) is preferably within a range of 1 to 4, and the pH is particularly preferably 1 to 3. At this time, the pH of the ink composition (25° C.) is preferably equal to or greater than 7.5 (more preferably equal to or greater than 8.0).

In particular, from the viewpoints of image density, resolution, and high-speed ink jet recording, a case where the pH of the ink composition (25° C.) is equal to or greater than 8.0 and the pH of the treatment liquid (25° C.) is 0.5 to 4 is preferable.

In particular, an acidic substance with high water solubility is preferable as the agglomeration component of the present invention, and in terms of increasing the agglomeration ability and fixing the entirety of the ink, an organic acid is preferable, a diprotic or higher organic acid is more preferable, and a diprotic or triprotic acidic substance is particularly preferable. As the diprotic or higher organic acid, an organic acid with a first pKa of equal to or less than 3.5 is preferable, and an organic acid with a first pKa of equal to or less than 3.0 is more preferable. Specific examples preferably include phosphoric acid, oxalic acid, malonic acid, citric acid, and the like.

Examples of the polyvalent metallic salt include a salt of an alkaline earth metal in group 2 of the periodic table (for example, magnesium, calcium), a transition metal in group 3 of the periodic table (for example, lanthanum), a cation from group 13 of the periodic table (for example, aluminum), a lanthanide (for example, neodymium), and the like. A carboxylate (formate, acetate, benzoate, and the like), a nitrate, a chloride, or a thiocyanate is preferable as the metallic salt. In particular, a calcium salt or a magnesium salt of carboxylic acid (formate, acetate, benzoate, and the like), a calcium salt or a magnesium salt of nitric acid, calcium chloride, magnesium chloride, or a calcium salt or a magnesium salt of thiocyanic acid is preferable.

An agglomeration component may be used alone or by mixing two or more types.

The content amount of the agglomeration component that agglomerates the ink composition in the treatment liquid is preferably within a range of 1 to 50 mass %, more preferably within a range of 3 to 45 mass %, and even more preferably within a range of 5 to 40 mass %.

In addition to being contained in the ink composition, at least one type of polymerization initiator that initiates polymerization of the polymerizable compound in the ink composition using active energy rays may also be contained in the treatment liquid. One type of polymerization initiator may be used alone, two or more types may be mixed, or a polymerization initiator may be used along with a sensitizer.

Similarly to the ink composition, the polymerization initiator that is used in the treatment liquid can be selected as appropriate from compounds that can initiate a polymerization reaction of the polymerizable compound using active energy rays. Examples of polymerization initiators include polymerization initiators (for example, photopolymerization initiators and the like) that generate active species (radicals, acids, bases, and the like) using radiation, light, or electron beams. Details of the photopolymerization initiator and the like are as described in the section of the ink composition.

Further, other additives may be further contained in the treatment liquid as other components within a range of not impairing the effect of the present invention. Examples of other additives include known additives such as a polymerization inhibitor, an anti-drying agent (wetting agent), an anti-fading agent, an emulsion stabilizer, a penetration enhancer, an ultraviolet absorbing agent, a preservative, a fungicide, a pH adjusting agent, a surface tension adjusting agent, a defoaming agent, a viscosity adjusting agent, a dispersant, a dispersion stabilizer, a rust inhibitor, and a chelating agent.

<Image Forming Method>

An image forming method of the present invention is configured by providing at least an ink application process of applying the ink composition of the present invention described earlier to a recording medium through an ink jet method and forming an image. With the image forming method of the present invention, since the ink composition described above is used, the adhesiveness of the image is excellent and recoverability after being left for a period when use is interrupted or stopped, such as in long-term preservation or use in a high temperature environment, is excellent.

—Ink Application Process—

The ink application process applied the ink composition of the present invention described earlier to a recording medium using an ink jet method. In the present process, the ink composition can be applied selectively to the recording medium to form a desired visual image. Here, details of the ink composition such as details of the ink composition and the preferable aspects are as described earlier in the description relating to the ink composition.

Image formation using an ink jet method forms a color image by conferring energy and discharging the ink composition described earlier on a desired recording medium. Here, the method described in paragraph numbers 0093 to 0105 of JP2003-306623A can be applied as a preferable ink jet method of the present invention.

There is no particular limitation on the ink jet method, and any known method such as, for example, a charge control method of discharging ink using electrostatic induction, a drop-on-demand method (pressure pulse method) that uses the vibration pressure of a piezo element, an acoustic ink jet method that discharges ink using irradiation pressure by changing an electrical signal into an acoustic beam and irradiating the ink, or a thermal ink jet (bubble jet (registered product)) method that uses the pressure that is generated when the ink is heated and bubbles are formed may be used. As the ink jet method, in particular, using the method described in JP1979-59936A (JP-S54-59936A), an ink jet method of causing a sudden change in the volume of ink that receives the effect of thermal energy and discharging the ink from nozzles by the effective force that is caused by the change in state can be used effectively.

Here, the ink jet method includes a method of injecting many ink dots with low concentrations known as photo ink at small volumes, a method of improving image quality using a plurality of inks with essentially the same color phase and different concentrations, and a method of using a colorless and transparent ink.

As the ink jet head, there is a shuttle method of using a short serial head and performing recording while scanning the head in the width direction of the recording medium, and a line method using a line head in which recording elements are arranged to correspond to the entire region of one side of the recording medium. With the line method, image recording can be performed on the entire surface of the recording medium by scanning the recording medium in a direction that is orthogonal to the arrangement direction of the recording elements, which makes a transport system such as a carriage that scans the short head unnecessary. Further, since complex scan control of the movement of the carriage and the recording medium is unnecessary and only the recording medium moves, higher-speed recording compared to the shuttle method can be realized. While the image forming method of the present invention can be applied to either of the above, there is generally a large improvement effect of discharge precision and abrasion resistance of the image in a case where the image forming method of the present invention is applied to the line method that does not use a dummy jet.

From the viewpoint of obtaining a highly detailed image, the droplet volume of the ink that is discharged from the ink jet head is preferable 1 to 10 pl (picoliters) is preferable, and 1.5 to 6 pl is more preferable. Further, from the viewpoint of improving image unevenness and the connections between consecutive gradations, it is also effective to discharge different droplet volumes in combination, in which case the present invention can also be used favorably.

—Treatment Liquid Application Process—

It is preferable that the image forming method of the present invention be configured by further providing a treatment liquid application process of applying a treatment liquid including an agglomeration component that forms an agglomeration when in contact with the ink composition to a recording medium.

The treatment liquid application process applies a treatment liquid including an agglomeration component that agglomerates the components in the ink composition to a recording medium, and forms an image by bringing the treatment liquid into contact with the ink composition. In such a case, dispersed particles such as the solid solution pigment in the ink composition agglomerate and an image is fixed on the recording medium. Here, the treatment liquid contains at least an agglomeration component, and details and preferable aspects of each component are as described earlier.

Application of the treatment liquid can be performed by applying a known method such as a coating method, an ink jet method, and an immersion method. The coating method can be performed using a known coating method using a bar coater, an extrusion die coater, an air doctor coater, a blade coater, a rod coater, a knife coater, a squeeze coater, a reverse roll coater, a bar coater, or the like. Details of the ink jet method are as described earlier.

The treatment liquid application process may be performed either before or after the ink application process using the ink composition. According to the present invention, an aspect of performing the ink application process after applying the treatment liquid in the treatment liquid application process is preferable. Specifically, an aspect of forming an image by applying the treatment liquid for agglomerating dispersed particles such as the solid solution pigment in the ink composition in advance before the ink composition is applied to the recording medium, and applying the ink composition to come into contact with the treatment liquid that is applied to the recording medium is preferable. In so doing, high speed ink jet recording is possible, and an image with high density and resolution is obtained even with high-speed recording.

While the application amount of the treatment liquid is not particularly limited as long as the ink composition can be agglomerated, an amount at which the application amount of the agglomeration component is equal to or greater than 0.1 g/m$^2$ is preferable. In particular, an amount at which the application amount of the agglomeration component is 0.2 to 0.7 g/m$^2$ is preferable. If the application amount of the agglomeration component is equal to or greater than 0.1 g/m$^2$, favorable high-speed agglomeration ability can be maintained according to various usage aspects of the ink composition. Further, it is preferable that the application amount of the agglomeration component be equal to or less than 0.7 g/m$^2$ so that the surface property of the recording medium on which the agglomeration component is applied is not negatively affected (change in luster or the like).

Further, according to the present invention, the ink application process is performed after the treatment liquid application process while applying the treatment liquid to the recording liquid and applying the ink composition, it is preferable to further perform a heat drying process of heating and drying the treatment liquid on the recording medium. By heating and drying the treatment liquid in advance before the ink application process, the ink coloring ability such as bleeding prevention becomes favorable, and a visible image with favorable color density and color phase can be recorded.

The heating and drying is performed through known means for heating such as a heater, means for ventilating using ventilation such as a dryer, or means that combines the two. Examples of the heating method include a method of heating using a heater or the like from the opposite side to the application face of the treatment liquid on the recording medium, a method of directing warm air or hot air on the application face of the treatment liquid on the recording medium, a heating method using an infrared heater, and the like, or heating may be carried out by combining a plurality of methods.

—Recording Medium—

The image forming method of the present invention is to record an image on a recording medium. While the recording medium is not particularly limited, generic printing paper based on cellulose such as so-called high-quality paper, coated paper, and art paper which can be used in general offset printing. In image recording using a generic ink jet method using water-based ink, generic printing paper based on cellulose has relatively slow absorption and drying of ink, the coloring material tends to move after the ink lands, and the image quality tends to decrease. However, according to the image forming method of the present invention, coloring material movement is suppressed, and a high quality image with excellent color density and color phase can be recorded.

A generic, commercially available recording medium may be used, examples of which include high-quality paper (A) such as "OK Prince High Quality" manufactured by Oji Paper Co., Ltd., "Shiraoi" manufactured by Nippon Paper Industries Co., Ltd., and "New NPI High Quality" manufactured by Nippon Paper Industries Co., Ltd., fine coated paper such as "OK Ever Light Coat" manufactured by Oji Paper Co., Ltd., "Aurora S" manufactured by Nippon Paper Industries Co., Ltd., lightweight coated paper (A3) such as "OK Coat L" manufactured by Oji Paper Co., Ltd. and "Aurora L" manufactured Nippon Paper Industries Co., Ltd., coated paper (A2, B2) such as "OK Top Coat+" manufactured by Oji Paper Co., Ltd. and "Aurora Coat" manufactured by Nippon Paper Industries Co., Ltd., and art paper (A1) such as "OK Kinfuji+" by Oji Paper Co., Ltd. and "Tokubishi Art" manufactured by Mitsubishi Paper Mills Limited, and the like. Further, it is also possible to use various dedicated photo papers for ink jet recording.

Among the recording medium, a so-called coated paper that is used for generic offset printing and the like is preferable. Coated paper has a coating layer that is provided by applying a coating material on the surface of high quality paper, acid-free paper, or the like based on cellulose which is not generally surface-treated. In image formation using normal water-based ink jet, coated paper tends to have problems in terms of quality with the luster of the image, abrasion resistance, and the like. However, in the image forming method of the present invention, luster unevenness is suppressed and an image with favorable luster and abrasion resistance is obtained. In particular, it is preferable that coated paper including the original paper and a coating layer including an inorganic pigment be used, and it is more preferable that coated paper including the original paper and a coating layer including one or both of kaolin and calcium bicarbonate be used. Specifically, art paper, coated paper, lightweight coated paper, or fine coated paper is more preferable.

EXAMPLES

While the present invention will be described more specifically below using embodiments, the present invention is not limited to the examples below without departing from the gist thereof. Here, unless otherwise stated, "parts" is the proportion by mass.

<Synthesis of Synergist>

(1. Synthesis Example of Synergist S1 Including Basic Group)

After chloroacetamidemethylating 2,9-dimethylquinacridone through an ordinary method, dim ethylaminopropylamine was reacted therewith to synthesize dimethylaminopropylamino acetamidemethyl-2,9-dimethylquinacridone.

(2. Synthesis Example of Synergist S2 Including Basic Group)

2-Methoxy-4-phenylamino-6-morpholinoethylamino-1,3,5-triazine was synthesized by reacting N-chloro-ethylmorpholine with 2-methoxy-4-phenyl-amino-6-amino-1,3,5-triazine.

(3. Synthesis Example of Synergist S3 Including Basic Group)

2-Morpholino propyl sulfamoyl acridone was synthesized by the chlorosulfonation of an acridone through an ordinary method and reacting with morpholino propylamine.

(4. Synthesis Example of Synergist S4 Including Basic Group)

2-N-Dimethylaminopropylcarbamoyl-anthraquinone was synthesized by converting anthraquinone-2-carboxylic acid into an acid chloride through an ordinary method and reacting with dimethylaminopropylamine.

The structures of Synergists 51 to S4 synthesized above are shown below sulfoxide containing 10% water were weighed into a flask and stirred to form a homogeneous slurry while adding 7.5 parts of potassium hydroxide.

After continuous stirring for approximately two hours, the miniscule amounts of insoluble matter and the like were removed using a filter. The obtained slurry was cooled to 0° C., and while maintaining the temperature and continuing to stir, aqueous sulfuric acid in which 5 parts of sulfuric acid was

[Chem. 16]

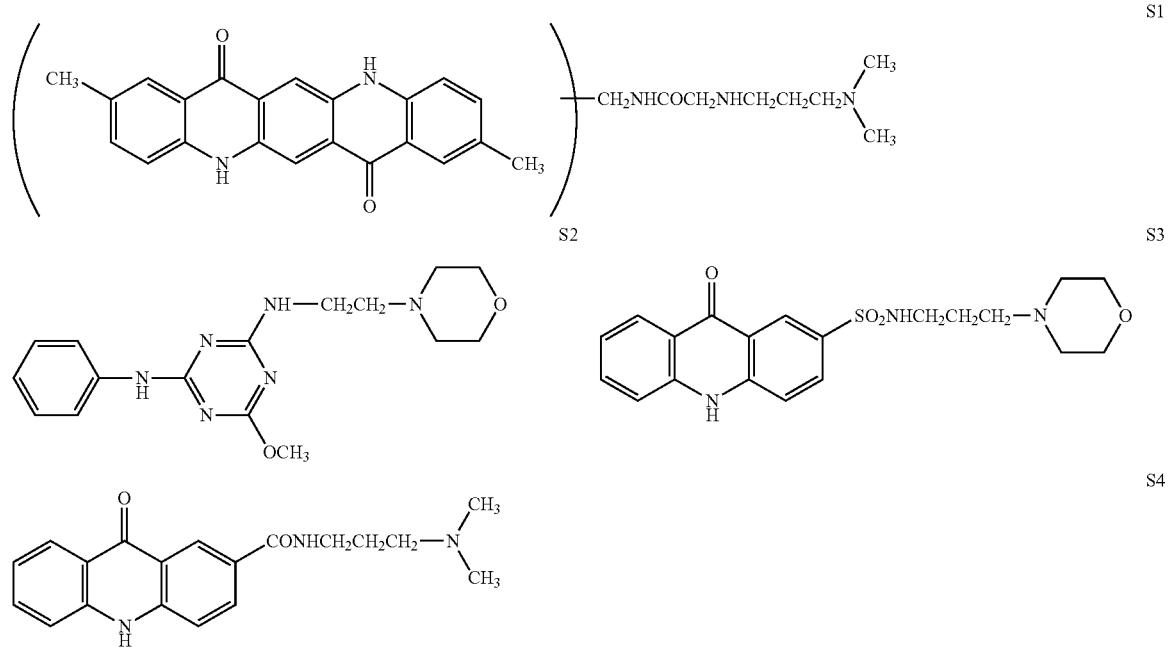

<Preparation of Polymer Dispersant>

(Synthesis of Water-Insoluble Resin P-1)

88 g of methyl ethyl ketone was added to a 1000 ml three-necked flask that included a stirrer and condenser and heated in a nitrogen atmosphere to 72° C., and a solution in which 0.85 g of dimethyl-2,2'-azobisisobutyrate, 50 g of phenoxyethyl methacrylate, 13 g of methacrylic acid, and 37 g of methyl methacrylate were dissolved in 50 g of methyl ethyl ketone was added dropwise thereto over three hours. After reacting for a further hour after the end of dropwise addition, a solution in which 0.42 g of dimethyl-2,2'-azobisisobutyrate was dissolved in 2 g of methyl ethyl ketone was added thereto, and heated to and maintained at 78° C. for four hours. The obtained reaction solution was reprecipitated twice in excess hexane and the precipitated resin was dried to obtain 96.5 g of a phenoxyethyl methacrylate/methyl methacrylate/methacrylic acid (copolymer ratio [mass ratio]=50/37/13) copolymer (Water-Insoluble Resin P-1)

The composition of the obtained Water-Insoluble Resin P-1 was verified using $^1$H-NMR, and the weight-average molecular weight (Mw) found using GPC was 49400. Furthermore, the acid value of the water-insoluble resin found using a method regulated by the JIS standard (JIS K 0070: 1992) was 84.8 mg KOH/g.

<Preparation Method of Quinacridone Solid Solution Pigment 1 Made of C.I. Pigment Violet 19 and C.I. Pigment Red 202>

4 parts of crude unsubstituted quinacridone, 16 parts of crude 2,9-dichloroquinacridone, and 150 parts of dimethyl diluted with 10 parts of deionized water was added dropwise thereto slowly over approximately 5 minutes through a dropping funnel. After the end of dropwise addition, stirring was continued to maintain a sufficiently homogeneous slurry form and matured for one hour. The slurry viscosity was then lowered through dilution using 150 parts of water and the slurry was filtered through a filter. The obtained cake-like matter was dispersed again in 1 L of water with a dispersing mixer to wash and filtered once again. After repeating dilution, filtration, and redispersion in water to washing three times, the cake was dried for 12 hours using a 60° C. warm air dryer to obtain the target Solid Solution Pigment 1 with a recovery rate that is close to approximately a fixed amount.

<Preparation Method of Quinacridone Solid Solution Pigment 2 Made of C.I. Pigment Violet 19 and C.I. Pigment Red 122>

Other than using 6 parts of crude unsubstituted quinacridone and 14 parts of crude 2,9-dimethylquinacridone instead of 4 parts of crude unsubstituted quinacridone and 16 parts of crude 2,9-dichloroquinacridone in the preparation method of Solid Solution Pigment 1, Solid Solution Pigment 2 was obtained similarly to the preparation method of Solid Solution Pigment 1.

<Preparation of Water-Based Solid Solution Pigment Dispersant>

(Preparation of Magenta Solid Solution Pigment Water-Based Dispersant A1)

After kneading 10 parts of the quinacridone Solid Solution Pigment 1 made of C.I.

Pigment Violet 19 and C.I. Pigment Red 202 (C.I. Pigment Violet 19/C.I. Pigment Red 202 (mass ratio)=20/80), 1 part of the Synergist S1 (synergist including a basic group), 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugation treatment for 30 minutes at 7000 rpm using a 50 mL centrifuge tube using a High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 78 nm. The pigment concentration was then found using the light absorbance spectrum, and by adding deionized water, the Magenta Solid Solution Pigment Water-Based Dispersant A1 was obtained as a resin-covered pigment particle (capsulized pigment) dispersant with a pigment concentration of 16 mass %.

(Preparation of Magenta Solid Solution Pigment Water-Based Dispersant A2)

After kneading 10 parts of the quinacridone Solid Solution Pigment 1 made of C.I. Pigment Violet 19 and C.I. Pigment Red 202 (C.I. Pigment Violet 19/C.I. Pigment Red 202 (mass ratio)=20/80), 1 part of the Synergist S2 (synergist including a basic group), 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 80 nm. The pigment concentration was then found using the light absorbance spectrum, and by adding deionized water, the Magenta Solid Solution Pigment Water-Based Dispersant A2 was obtained as a resin-covered pigment particle (capsulized pigment) dispersant with a pigment concentration of 16 mass %.

(Preparation of Magenta Solid Solution Pigment Water-Based Dispersant A3)

After kneading 10 parts of the quinacridone Solid Solution Pigment 1 made of C.I. Pigment Violet 19 and C.I. Pigment Red 202 (C.I. Pigment Violet 19/C.I. Pigment Red 202 (mass ratio)=20/80), 1 part of the Synergist S3 (synergist including a basic group), 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 81 nm. The pigment concentration was then found using the light absorbance spectrum, and by adding deionized water, the Magenta Solid Solution Pigment Water-Based Dispersant A3 was obtained as a resin-covered pigment particle (capsulized pigment) dispersant with a pigment concentration of 16 mass %.

(Preparation of Magenta Solid Solution Pigment Water-Based Dispersant A4)

After kneading 10 parts of the quinacridone Solid Solution Pigment 1 made of C.I. Pigment Violet 19 and C.I. Pigment Red 202 (C.I. Pigment Violet 19/C.I. Pigment Red 202 (mass ratio)=20/80), 1 part of the Synergist S4 (synergist including a basic group), 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikki so Co., Ltd.), the volume average particle diameter was 77 nm. The pigment concentration was then found using the light absorbance spectrum, and by adding deionized water, the Magenta Solid Solution Pigment Water-Based Dispersant A4 was obtained as a resin-covered pigment particle (capsulized pigment) dispersant with a pigment concentration of 16 mass %.

(Preparation of Magenta Solid Solution Pigment Water-Based Dispersant A5)

After kneading 10 parts of the quinacridone Solid Solution Pigment 2 made of C.I. Pigment Violet 19 and C.I. Pigment Red 122 (C.I. Pigment Violet 19/C.I. Pigment Red 122 (mass ratio)=30/70), 1 part of the Synergist S1 (synergist including a basic group), 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 75 nm. The pigment concentration was then found using the light absorbance spectrum, and by adding deionized water, the Magenta Solid Solution Pigment Water-Based Dispersant A5 was obtained as a resin-covered pigment particle (capsulized pigment) dispersant with a pigment concentration of 16 mass %.

(Preparation of Magenta Solid Solution Pigment Water-Based Dispersant A6)

After kneading 10 parts of the quinacridone Solid Solution Pigment 2 made of C.I. Pigment Violet 19 and C.I. Pigment Red 122 (C.I. Pigment Violet 19/C.I. Pigment Red 122 (mass ratio)=30/70), 1 part of the Synergist S2 (synergist including a basic group), 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 78 nm. The pigment concentration was then found using the light absorbance spectrum, and by adding deionized water, the Magenta Solid Solution Pigment Water-Based Dispersant A6 was obtained as a resin-covered pigment particle (capsulized pigment) dispersant with a pigment concentration of 16 mass %.

(Preparation of Magenta Solid Solution Pigment Water-Based Dispersant A7): For Comparison 11 parts of the quinacridone Solid Solution Pigment 1 made of C.I. Pigment Violet 19 and C.I. Pigment Red 202 (C.I. Pigment Violet 19/C.I. Pigment Red 202 (mass ratio)=20/80), 5.2 parts of the polymer dispersant P-1, 20 parts of methyl ethyl ketone, 8 parts of 1 mol/L NaOH aqueous solution, and 55.8 parts of deionized water were dispersed for 6 hours using 0.1 mm φ zirconia beads using a bead mill. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 74 nm. The pigment concentration was then found using the light absorbance spectrum, and by adding deionized water, the Magenta Solid Solution Pigment Water-Based Dispersant A7 was obtained as a resin-covered pigment particle (capsulized pigment) dispersant with a pigment concentration of 16 mass %.

(Preparation of Magenta Solid Solution Pigment Water-Based Dispersant A8): For Comparison 11 parts of the quinacridone Solid Solution Pigment 2 made of C.I. Pigment Violet 19 and C.I. Pigment Red 122 (C.I. Pigment Violet 19/C.I. Pigment Red 122 (mass ratio)=30/70), 5.1 parts of the polymer dispersant P-1, 20 parts of methyl ethyl ketone, 7.9 parts of 1 mol/L NaOH aqueous solution, and 56 parts of deionized water were mixed and dispersed for 6 hours using 0.1 mm φ zirconia beads using a bead mill. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 73 nm. The pigment concentration was then found using the light absorbance spectrum, and by adding deionized water, the Magenta Solid Solution Pigment Water-Based Dispersant A8 was obtained as a resin-covered pigment particle (capsulized pigment) dispersant with a pigment concentration of 16 mass %.

(Preparation of Magenta Pigment Water-Based Dispersant B1): For Comparison

After kneading 10 parts of C.I. Pigment Violet 19 pigment, 1 part of the Synergist S1 including a basic group, 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 80 nm. The pigment concentration was then found using the light absorbance spectrum, and by adding deionized water, the Magenta Pigment Water-Based Dispersant B1 was obtained as a resin-covered pigment particle (capsulized pigment) dispersant with a pigment concentration of 16 mass %.

(Preparation of Magenta Pigment Water-Based Dispersant B2): For Comparison

After kneading 10 parts of a C.I. Pigment Violet 122 pigment, 1 part of the Synergist S1 including a basic group, 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 77 nm. The pigment concentration was then found using the light absorbance spectrum, and by adding deionized water, the Magenta Pigment Water-Based Dispersant B2 was obtained as a resin-covered pigment particle (capsulized pigment) dispersant with a pigment concentration of 16 mass %.

(Preparation of Magenta Pigment Water-Based Dispersant B3): For Comparison

After kneading 10 parts of a C.I. Pigment Violet 202 pigment, 1 part of the Synergist S1 including a basic group, 4.9 parts of the polymer dispersant P-1, 20 parts of methyl ethyl ketone, and 8.1 parts of 1 mol/L NaOH aqueous solution using a roll mill for 2 to 8 hours as necessary, the kneaded substance was dispersed in 60 parts of deionized water. The methyl ethyl ketone was removed from the obtained dispersant under reduced pressure at 55° C., and a portion of the water was also removed.

The obtained concentrated liquid was cooled to room temperature, and the supernatant solution other than precipitated matter was collected by performing a centrifugal treatment for 30 minutes at 7000 rpm using a 50 mL centrifuge tube using High-Speed Centrifugal Cooler 7550 (manufactured by Kubota Corporation).

When the volume average particle diameter of the resin-covered pigment particles (capsulized pigment) was measured through a dynamic light scattering method using the Nanotrack particle size distribution measurement device UPA-EX150 (manufactured by Nikkiso Co., Ltd.), the volume average particle diameter was 83 nm. The pigment concentration was then found using the light absorbance spectrum, and by adding deionized water, the Magenta Pigment Water-Based Dispersant B3 was obtained as a resin-covered pigment particle (capsulized pigment) dispersant with a pigment concentration of 16 mass %.

(Preparation of Ink Compositions 1 to 12)

Using the Magenta Solid Solution Pigment Water-Based Dispersants A1 to A8 and B1 to B3 obtained above, the following Polymerizable Compound 1, the Synergists S1 to S4 described above, and colloidal silica (Snowtex XS, average particle diameter 5 nm, manufactured by Nissan Chemical Industries, Ltd.), each component was mixed to be the following compositions. The compositions were filled into plastic disposable syringes and filtered through a PVDF 5 μm filter (Millex-SV, diameter 25 mm, manufactured by Millipore Corporation) to prepare Ink Compositions 1 to 12.

Each composition (Ink Compositions 1 to 12) of the Ink Compositions 1 to 12 are shown below.

[Chem. 17]

Polymerizable Compound 1

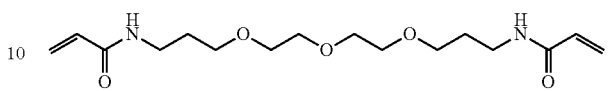

<Ink Composition 1>

| | |
|---|---|
| Magenta Solid Solution Pigment Water-Based Dispersant A1 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 2>

| | |
|---|---|
| Magenta Solid Solution Pigment Water-Based Dispersant A2 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 3>

| | |
|---|---|
| Magenta Solid Solution Pigment Water-Based Dispersant A3 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |

| | |
|---|---|
| Irgacure 2959 (manufactured by BASF Japan Ltd.) | 2.9 mass % |
| Deionized water | remainder (added to make a total of 100 mass %) |

<Ink Composition 4>

| | |
|---|---|
| Magenta Solid Solution Pigment Water-Based Dispersant A4 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 5>

| | |
|---|---|
| Magenta Solid Solution Pigment Water-Based Dispersant A5 | 25 mass % |
| Polymerizable Compound | 19 mass % |
| Diethylene glycol monoethyl ether (DEGmEE, manufactured by Wako Pure Chemical Industries, Ltd.) Chemical Industries, Ltd.) | 1 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 6>

| | |
|---|---|
| Magenta Solid Solution Pigment Water-Based Dispersant A6 | 25 mass % |
| Polymerizable Compound | 19 mass % |
| Diethylene glycol monoethyl ether (DEGmEE, manufactured by Wako Pure Chemical Industries, Ltd.) Chemical Industries, Ltd.) | 1 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 7>: For Comparison

| | |
|---|---|
| Magenta Solid Solution Pigment Water-Based Dispersant A7 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 8>: For Comparison

| | |
|---|---|
| Magenta Solid Solution Pigment Water-Based Dispersant A8 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 9>: For Comparison

| | |
|---|---|
| Magenta Pigment Water-Based Dispersant B1 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

<Ink Composition 10>: For Comparison

| | |
|---|---|
| Magenta Pigment Water-Based Dispersant B2 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

\<Ink Composition 11\>: For Comparison

| | |
|---|---|
| Magenta Pigment Water-Based Dispersant B3 | 25 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

\<Ink Composition 12\>

| | |
|---|---|
| Magenta Pigment Water-Based Dispersant A1 | 30 mass % |
| Polymerizable Compound | 19 mass % |
| Diethylene glycol monoethyl ether (DEGmEE, manufactured by Wako Pure Chemical Industries, Ltd.) | 1 mass % |
| Colloidal silica (solid content) (Snowtex XS, solid content concentration: 20 mass %, manufactured by Nissan Chemical Industries, Ltd.) | 0.05 mass % |
| Olfin E1010 (manufactured by Nissin Chemical Co., Ltd.) | 1 mass % |
| Irgacure 2959 (manufactured by BASF Japan Ltd.) | 2.9 mass % |
| Deionized water | remainder (added to make a total of 100 mass %) |

\<Preparation of Treatment Liquid\>

Treatment Liquid 1 was prepared by mixing the components of the following compositions.

\<Composition of Treatment Liquid 1\>

| | |
|---|---|
| Malonic acid (manufactured by Wako Pure Chemical Industries, Ltd.) | 25.0 mass % |
| Diethylene glycol monoethyl ether (manufactured by Wako Pure Chemical Industries, Ltd.) | 20.0 mass % |
| Emulgen P109 (manufactured by Kao Corporation, nonionic surfactant) | 1.0 mass % |
| Deionized water | 54 mass % |

\<Image Formation and Evaluation\>

An ink jet head having a silicon nozzle plate was prepared, and the magenta-based Ink Compositions A1 to A8 and B1 to B3 obtained above were sequentially refilled into a reservoir tank that is connected to the ink jet head. Here, a liquid-repellent film formed by using a fluorinated alkylsilane compound was provided on the surface of the silicon nozzle plate in advance.

Further, a strip of paper cut to an A5 size from "OK Top Coat+" (basis weight of 104.7 g/m$^2$) manufactured by Oji Paper Co., Ltd. was used as the recording medium.

The strip of paper cut to an A5 size was fixed to a stage that is movable in a predetermined linear direction at 500 mm/second, and the stage temperature was maintained at 30° C. The Treatment Liquid 1 obtained earlier was coated on the strip of paper using a bar coater for a thickness of approximately 1.2 µm (application amount of agglomeration component: 0.5 g/m$^2$), and was dried at 50° C. for two seconds immediately after the coating. The ink jet head was then fixed and arranged so that the direction of the line head in which the nozzles are lined up (main scanning direction) was inclined at 75.7 degrees with respect to a direction that is orthogonal to the movement direction of the stage (sub-scanning direction), and a solid image was formed by discharging ink on the entire surface of the recording medium while moving the recording medium in the sub-scanning direction at a fixed speed using a line method with the discharge conditions of an ink droplet volume of 2.8 pL, a discharge frequency of 25.5 kHz, and a resolution of 1200 dpi×1200 dpi.

After the image formation, warm air of 120° C. and 5 m/sec was directed from a ventilator to the landing surface for 15 seconds to dry the landing surface while heating from the reverse side (back side) of the ink landing surface using an infrared heater. After drying the image, ultraviolet rays (metal halide lamp manufactured by Eye Graphics Co., Ltd., maximum irradiation wavelength: 365 nm) were irradiated at an accumulated irradiation amount of 3 J/cm$^2$ to cure the image and obtain an image sample.

\<Evaluation\>

—1. Adhesiveness—

The obtained image sample was left for 24 hours at 23° C. in a 45% RH environment. Cellotape (registered product, LP-12, manufactured by Nichiban Co., Ltd.) with a length of 3 cm was placed on the surface of the solid image after the image sample was left, and the Cellotape (registered product) was peeled off after five seconds. The Cellotape (registered product) that was peeled off from the image sample was then observed with the naked eye and evaluated according to the following evaluation standards. Of the following evaluation standards, "D" is a level that would cause hindrance in actual use. The evaluation results are shown in the following Table 1.

\<Evaluation Standards\>

A: There is no color attached to the tape, and no deterioration was observed in the solid image of the image sample.

B: Although there was color attached to the tape, no deterioration was observed in the solid image of the image sample.

C: Color was attached to the tape, and deterioration was observed in the solid image of the image sample.

D: Color was attached to an area of equal to or greater than one-half of the tape, and the solid image of the image sample was lost.

—2. Recoverability After Being Left—

To evaluate the recoverability after being left, after discharge of the ink composition was stopped in the ink jet recording device and the device was left for a certain period of time, the discharge stability when the discharge of ink was resumed was evaluated.

Specifically, using Image Photo Finish Pro manufactured by Fujifilm Holdings Corporation as the recording medium, the stage holding the recording medium was moved at 248 mm/minute. Furthermore, the ink composition was discharged parallel to the transport direction with the conditions of 2000 drops per nozzle, ink drop amount: 4.2 pL, discharge frequency: 10 kHz, nozzle arrangement direction×transport direction: 75×1200 dpi to form 96 lines and create an image sample (line image). At this time, an ink composition that had been preserved for two weeks at 45° C. was used. Here, other detailed conditions of the image formation were similar to when the solid image described above was formed.

Next, the obtained image sample was observed with the naked eye to verify that ink is discharged from all nozzles.

After forming the line image, the head was left in that state for a predetermined length of time, a new recording medium was then applied, and an image sample (line image) was created by once again discharging ink with the same conditions described above.

While observing the obtained image sample (line image) with the naked eye, the recoverability after being left was evaluated based on the maximum length of time for which all 96 nozzles could discharge ink when discharging 2000 jets after leaving the device for a predetermined length of time. Evaluation was made based on the following evaluation standards. In the evaluation, the longer the length of time for which the device was left without discharge failure, the better the discharge ability, and of the following standard, "D" is a level that would cause hindrance in actual use. The evaluation results are shown in the following Table 1.

<Evaluation Standards>
A: the maximum period of time for which the device could be left was equal to or greater than 50 minutes.
B: the maximum period of time for which the device could be left was equal to or greater than 35 minutes and less than 50 minutes.
C: the maximum period of time for which the device could be left was equal to or greater than 20 minutes and less than 35 minutes.
D: the maximum period of time for which the device could be left was less than 20 minutes.

TABLE 1

| | Water-based dispersant | | | | Evaluation | | |
| --- | --- | --- | --- | --- | --- | --- | --- |
| | Type | Pigment | Synergist | Vinyl polymer | q:p [mass ratio] | Adhesiveness | Recoverability after being left | Remarks |
| Ink 1 | A1 | Solid solution pigment 1 | S1 | P-1 | 1:4.8 | A | A | Present Invention |
| Ink 2 | A2 | Solid solution pigment 1 | S2 | P-1 | 1:4.8 | A | B | Present Invention |
| Ink 3 | A3 | Solid solution pigment 1 | S3 | P-1 | 1:4.8 | C | B | Present Invention |
| Ink 4 | A4 | Solid solution pigment 1 | S4 | P-1 | 1:4.8 | C | A | Present Invention |
| Ink 5 | A5 | Solid solution pigment 2 | S1 | P-1 | 1:4.8 | A | B | Present Invention |
| Ink 6 | A6 | Solid solution pigment 2 | S2 | P-1 | 1:4.8 | B | A | Present Invention |
| Ink 7 | A7 | Solid solution pigment 1 | — | P-1 | 1:4.8 | D | C | Comparison |
| Ink 8 | A8 | Solid solution pigment 2 | — | P-1 | 1:4.8 | C | D | Comparison |
| Ink 9 | B1 | PV19 | S1 | P-1 | 1:4.8 | D | C | Comparison |
| Ink 10 | B2 | PV122 | S1 | P-1 | 1:4.8 | D | C | Comparison |
| Ink 11 | B3 | PV202 | S1 | P-1 | 1:4.8 | D | D | Comparison |
| Ink 12 | A1 | Solid solution pigment 1 | S1 | P-1 | 1:4.0 | B | A | Present Invention |

*1: q:p represents the ratio (mass ratio) between quinacridone solid solution pigment and polymerizable compound.

As shown in Table 1, in the present invention, by using a solid solution pigment as a pigment that is contained as a colorant and using a synergist along with a vinyl polymer, the adhesiveness of the image was excellent, and the discharge ability of the ink after time elapse (recoverability after being left), that is, the stability of the ink composition itself after time was excellent.

On the other hand, with the compositions for comparison which use a solid solution pigment but do not contain a synergist, curability was insufficient or the stability of the ink was inferior. Further, with the compositions for comparison which did not use a solid solution pigment, curing did not progress sufficiently to the deep portions of the landed ink, making adhesiveness inferior along with the discharge ability of the ink after time elapse (recoverability after being left), that is, the stability of the ink composition itself with respect to time being inferior.

What is claimed is:

1. An ink composition comprising:
   coloring particles that include a quinacridone solid solution pigment including two or more types of quinacridone-based compounds, a synergist including a basic group, and a high-molecular weight vinyl polymer;
   a water-soluble polymerizable compound;
   a polymerization initiator; and
   water,
   wherein the synergist includes a structural moiety derived from at least one type selected from the group consisting of a quinacridone derivative, a triazine derivative, an acridone derivative, and an anthraquinone derivative.

2. The ink composition according to claim 1,
   wherein a ratio [q:p (mass ratio)] between the quinacridone solid solution pigment (q) and the polymerizable compound (p) is 1:1 to 1:20.

3. The ink composition according to claim 2,
   wherein the synergist includes a structural moiety derived from at least one type selected from the group consisting of a quinacridone derivative, an acridone derivative, and an anthraquinone derivative.

4. The ink composition according to claim 3,
   wherein the quinacridone solid solution pigment is at least one of a solid solution pigment of an unsubstituted quinacridone and a dimethyl-substituted quinacridone, and a solid solution pigment of an unsubstituted quinacridone and a dichloro-substituted quinacridone.

5. The ink composition according to claim 2,
   wherein the quinacridone solid solution pigment is at least one of a solid solution pigment of an unsubstituted quinacridone and a dimethyl-substituted quinacridone, and a solid solution pigment of an unsubstituted quinacridone and a dichloro-substituted quinacridone.

6. The ink composition according to claim 5,
wherein the synergist includes a structural moiety derived from a quinacridone derivative.

7. The ink composition according to claim 2,
wherein the synergist includes a structural moiety derived from a quinacridone derivative.

8. The ink composition according to claim 7,
wherein the polymerizable compound is represented by the following General Formula (1):

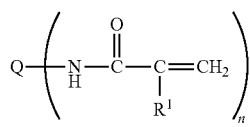

General Formula (1)

wherein in General Formula (1), Q represents an n-valent group, and R1 represents a hydrogen atom or a methyl group, n represents an integer of equal to or greater than 1.

9. The ink composition according to claim 1,
wherein the quinacridone solid solution pigment is at least one of a solid solution pigment of an unsubstituted quinacridone and a dimethyl-substituted quinacridone, and a solid solution pigment of an unsubstituted quinacridone and a dichloro-substituted quinacridone.

10. The ink composition according to claim 1,
wherein the polymerizable compound is represented by the following General Formula (1):

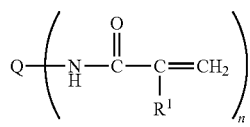

General Formula (1)

wherein in General Formula (1), Q represents an n-valent group, and R1 represents a hydrogen atom or a methyl group, n represents an integer of equal to or greater than 1.

11. An ink set comprising:
the ink composition according to claim 1; and
a treatment liquid including an agglomeration component that agglomerates the ink composition when coming into contact with the ink composition.

12. The ink set according to claim 11,
wherein the agglomeration component is an acidic compound.

13. An image forming method comprising:
applying an ink for forming an image by applying the ink composition according to claim 1 to a recording medium through an ink jet method.

14. The image forming method according to claim 13, further comprising:
applying a treatment liquid including an agglomeration component that agglomerates the ink composition when coming into contact with the ink composition to the recording medium.

15. The ink composition according to claim 1,
wherein a ratio [q:p (mass ratio)] between the quinacridone solid solution pigment (q) and the polymerizable compound (p) is 1:4 to 1:10.

16. The ink composition according to claim 1,
wherein the high-molecular weight vinyl polymer includes a constituent unit that is derived from an aromatic group-containing monomer as a hydrophobic group, the aromatic group-containing monomer being derived from at least one of phenoxyethyl(meth)acrylate and benzyl (meth)acrylate.

17. The ink composition according to claim 1,
wherein the basic group is at least one selected from the group consisting of a morpholino group, a piperazinyl group, a pyrrolidinyl group, a piperidinyl group, a pyridyl group, and a triazinyl group.

* * * * *